United States Patent
Chen et al.

(10) Patent No.: US 12,047,984 B2
(45) Date of Patent: Jul. 23, 2024

(54) METHOD AND DEVICE FOR RESOURCE CONFIGURATION AND DATA TRANSMISSION

(71) Applicant: DATANG MOBILE COMMUNICATIONS EQUIPMENT CO., LTD., Beijing (CN)

(72) Inventors: Li Chen, Beijing (CN); Yali Zhao, Beijing (CN); Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 404 days.

(21) Appl. No.: 17/422,170

(22) PCT Filed: Dec. 18, 2019

(86) PCT No.: PCT/CN2019/126352
§ 371 (c)(1),
(2) Date: Jul. 9, 2021

(87) PCT Pub. No.: WO2020/143416
PCT Pub. Date: Jul. 16, 2020

(65) Prior Publication Data
US 2022/0116951 A1   Apr. 14, 2022

(30) Foreign Application Priority Data
Jan. 10, 2019   (CN) .......................... 201910023977.8
Jan. 11, 2019   (CN) .......................... 201910028514.0

(51) Int. Cl.
*H04W 72/14*   (2009.01)
*H04W 72/53*   (2023.01)

(52) U.S. Cl.
CPC .................................. *H04W 72/53* (2023.01)

(58) Field of Classification Search
CPC ... H04L 5/0044; H04L 5/0053; H04L 5/0091; H04W 72/0446; H04W 72/1268;
(Continued)

(56) References Cited

U.S. PATENT DOCUMENTS

2018/0103460 A1*  4/2018  Sharma ................. H04W 72/23
2018/0132137 A1*  5/2018  Dai ........................ H04W 16/14
(Continued)

FOREIGN PATENT DOCUMENTS

CN    107027188 A    8/2017
CN    109150463 A    1/2019
(Continued)

OTHER PUBLICATIONS

LG Electronics, "Discussion on layer 1 enhancements for URLLC", 3GPP TSG RAN WG1 Meeting #94bis, Chengdu, China, Oct. 8-12, 2018, total 11 pages, R1-1810294.
(Continued)

*Primary Examiner* — Phuc H Tran
(74) *Attorney, Agent, or Firm* — Kilpatrick Townsend & Stockton LLP

(57) ABSTRACT

The present application discloses a method and device for resource configuration and data transmission, solving the problem of long transmission time delay in the existing method for pre-configuration resources which is unable to satisfy the business demand of 5G system for low time delay. According to the embodiment of the present application, a network side device configures pre-configuration resources for a terminal in advance, with multiple continuous resources being allocated within a pre-configuration resource period for a set of pre-configuration resources. When data arrives at the terminal, one of the multiple continuous pre-configuration resources is selected for data transmission, to avoid transmission delay caused by mis-
(Continued)

matching a resource origin with data traffic arrived at the terminal within the pre-configuration resource period when the network side device configures pre-configuration resources for the terminal.

18 Claims, 10 Drawing Sheets

(58) Field of Classification Search
CPC ..... H04W 72/23; H04W 72/53; H04W 76/14; H04W 76/38
See application file for complete search history.

(56) References Cited

U.S. PATENT DOCUMENTS

| | | | |
|---|---|---|---|
| 2018/0324772 A1* | 11/2018 | Babaei | H04L 5/00 |
| 2018/0368174 A1* | 12/2018 | Jeon | H04W 72/044 |
| 2020/0252910 A1* | 8/2020 | Wu | H04W 72/04 |
| 2020/0288490 A1* | 9/2020 | Lin | H04W 76/27 |

FOREIGN PATENT DOCUMENTS

| | | |
|---|---|---|
| TW | I637642 B | 10/2018 |
| WO | 2018128970 A1 | 7/2018 |
| WO | 2018171242 A1 | 9/2018 |
| WO | 2018232321 A2 | 12/2018 |
| WO | 2018237275 A1 | 12/2018 |

OTHER PUBLICATIONS

Samsung, "Scheduling of multiple transport blocks for MTC", 3GPP TSG RAN WG1 Meeting #95, Spokane, US, Nov. 12-16, 2018, total 7 pages, R1-1812941.

Huawei et al., "Transmission with configured grant in NR unlicensed band", 3GPP TSG RAN WG1 Meeting #95, Spokane, USA, Nov. 12-Nov. 16, 2018, total 9 pages, R1-1812197.

ZTE et al.., "Remaining details of UL transmission without grant", 3GPP TSG RAN WG1 Meeting 90bis, Prague,CZ, Oct. 9-13, 2017, total 8 pages, R1-1717442.

* cited by examiner

METHOD AND DEVICE FOR RESOURCE CONFIGURATION AND DATA TRANSMISSION

CROSS-REFERENCE OF RELATED APPLICATIONS

The present application is a National Stage of International Application No. PCT/CN2019/126352, filed on Dec. 18, 2019, which claims the priority from Chinese Patent Application No. 201910023977.8, filed with the Chinese Patent Office on Jan. 10, 2019 and entitled "Method and Device for Resource Configuration and Data Transmission", which is hereby incorporated by reference in its entirety; and the present application claims the priority from Chinese Patent Application No. 201910028514.0, filed with the Chinese Patent Office on Jan. 11, 2019 and entitled "Method and Device for Resource Configuration and Data Transmission", which is hereby incorporated by reference in its entirety.

FIELD

The present application relates to the field of communication technologies, and particularly to a method and device for resource configuration and data transmission.

BACKGROUND

The existing LTE (Long Term Evolution) provides an uplink Scheduling Request (SR) mechanism. If the UE has no uplink data to be transmitted, the eNodeB (Evolved Node B) does not need to allocate uplink resources for the UE; otherwise, this will cause a waste of resources. Therefore, the UE (User Equipment) needs to tell the eNodeB whether it has uplink data to be transmitted, so that the eNodeB can decide whether to allocate uplink resources to the UE. For this reason, the eNodeB can allocate a dedicated SR resource for each UE to send an SR. When the UE has uplink data to be sent but no uplink resource, the UE sends the SR on the SR resource and requests the eNodeB to allocate uplink resources. Undoubtedly, this mechanism increases the system delay.

Therefore, the 3GPP (Third Generation Partnership Project) protocol proposes the concept of pre-configured resources. The network-side device can pre-configure resources for a terminal. The types of pre-configured resources include pre-configured resource type 1 and pre-configured resource type 2. When the terminal has a service transmission requirement, the pre-configured resources can be used for transmission, reducing the transmission delay, and saving the delay of the terminal to send a scheduling request, obtain the uplink resources for buffering and reporting and then transmit data.

In one embodiment, when configuring the pre-configured resources for the terminal, the network-side device and the terminal can negotiate the starting point of the data that is about to arrive at the terminal, but actually the starting point of the pre-configured resources configured by the network-side device is difficult to completely match with the starting point of the data that arrives at the terminal, so the terminal may need to wait for the next pre-configured resource period to send data. Therefore, although the pre-configured resources alleviate the problem of transmission delay, the delay requirement cannot be met for scenarios with high delay requirement, for example, an important scenario proposed in the current 5G system—URLLC (Ultra Reliable Low Latency Communications) scenario, which requires the end-to-end latency to reach 0.5 ms.

To sum up, the current pre-configured resource method has a relatively large transmission delay and cannot meet the low delay service requirement of the 5G system.

BRIEF SUMMARY

The present application provides a method and device for resource configuration and data transmission, to solve the problem that the existing pre-configured resource method has a large transmission delay and cannot meet the low delay requirement of the 5G system.

In one embodiment, a method for resource configuration provided by an embodiment of the present application includes:
  determining, by a network-side device, multiple continuous resources in a set of pre-configured resources configured for a terminal, and the multiple continuous resources are within a pre-configured resource period; and pre-configuring, by the network-side device, the determined multiple continuous resources for the terminal.

In the above-mentioned method, the network-side device configures the pre-configured resources for the terminal in advance, and there are multiple continuous resource allocations in one pre-configured resource period of a set of pre-configured resources. When the data arrives at the terminal, one of multiple consecutive pre-allocated resources is selected for data transmission, avoiding the transmission delay due to the mismatching between the resource starting point in the pre-configured resource period and the data service arriving at the terminal when the network-side device configures the pre-configured resources for the terminal. In the embodiment of the present application, when the data service of the terminal arrives, the closest resource can be selected for data transmission among multiple continuous resources in the pre-configured resource period, to reduce the transmission delay.

In one embodiment, the multiple continuous resources include:
  continuous resources on adjacent symbols; or continuous resources on adjacent slots; or continuous resources on adjacent subframes; or adjacent continuous transmission resources in a same direction; and the adjacent continuous transmission resources in the same direction refer to resources continuously sent or continuously received by a same terminal, and include continuous uplink resources or continuous sidelink resources.

In the above method, the network-side device can configure multiple continuous resources for the terminal, and the continuous resources may be continuous on slots or continuous on symbols or continuous on subframes or continuous transmission resources in the same direction. Therefore, the way to configure pre-configured resources is more flexible and suitable for more terminals of different transmission types.

In one embodiment, the pre-configuring, by the network-side device, the determined multiple continuous resources for the terminal, further includes:
  configuring, by the network-side device, the number of continuous resources in a resource period for the terminal through RRC (Radio Resource Control) signaling used to configure pre-configured resources.

In one embodiment, in response to that the network-side device determines that resources that need to be configured for the terminal belong to a pre-configured resource type 2;
pre-configuring, by the network-side device, the determined multiple continuous resources for the terminal, further includes:
configuring, by the network-side device, a quantity of continuous resources in a resource period for the terminal through a PDCCH (Physical Downlink Control Channel) command used to activate pre-configured resources.

In one embodiment, after the network-side device pre-configures the determined multiple continuous resources for the terminal, the method further includes:
determining, by the network-side device, resources used by a first data packet sent by the terminal on the pre-configured resources, and enabling resources at a same position in each pre-configured resource period; and other resources are invalid for the terminal except for the enabled resources in the multiple continuous resources within the pre-configured resource period.

In the above method, after determining that the terminal sends the first data packet on the pre-configured resource, the network-side device uses the resource sending the data packet as the starting point, and enables the resource at the same position in each pre-configured resource period, that is, for the terminal, there is only one enabled resource in each pre-configured resource period, and the terminal can only send data on the enabled resource. Other resources in the same pre-configured resource period become invalid, and the network-side device can configure them for other terminals to use, or may dynamically schedule them for the terminal to use, avoiding the resource waste.

In one embodiment, after the network-side device pre-configures the determined multiple continuous resources for the terminal, the method further includes:
configuring, by the network-side device, a usage duration or usage number for disabling pre-configured resources for the terminal through RRC signaling; or
receiving, by the network-side device, indication information for disabling pre-configured resources sent by the terminal after the pre-configured resources are enabled, and the indication information is an MAC (Medium Access Control) subheader containing an LCID indicating the disabling of pre-configured resources, or the indication information is an MAC CE (MAC Control Element) containing pre-configured resource numbers of disabled pre-configured resources, and the MAC CE is used to instruct to disable pre-configured resources corresponding to the pre-configured resource numbers; and disabling pre-configured resources means that the pre-configured resources of the terminal roll back to a state where there are multiple continuous resources for allocation in a pre-configured resource period and the resources are activated and disabled.

In the foregoing manner, the network-side device can disable the pre-configured resources in the foregoing manner, which can avoid the resource waste, and the manner in which the network-side device schedules resources is more flexible and the resource manageability is stronger.

In one embodiment, in response to that the network-side device determines that resources that need to be configured for the terminal belong to a pre-configured resource type 1;
after the network-side device activates the resources at the same position in each resource period, the method further includes:
sending, by the network-side device, reconfiguration information containing pre-configured resources with same numbers as current pre-configured resources to the terminal through RRC signaling; and disabling, by the network-side device, pre-configured resources corresponding to the pre-configured resource numbers according to the reconfiguration information, and determining new pre-configured resources according to the reconfiguration information.

In the above method, the terminal can disable pre-configured resources according to specific scenarios, avoiding the resource waste.

In one embodiment, the network-side device determines that resources that need to be configured for the terminal belong to a pre-configured resource type 2;
after the network-side device pre-configures the determined multiple continuous resources for the terminal, the method further includes:
configuring, by the network-side device, a usage duration or usage number for releasing pre-configured resources for the terminal through RRC signaling, so that the terminal releases resources according to the usage duration or usage number for releasing pre-configured resources; or
receiving, by the network-side device, indication information for releasing pre-configured resources sent by the terminal after activating the pre-configured resources, and the indication information is an MAC subheader containing an LCID (Logical Channel ID) indicating the release of pre-configured resources, or the indication information is an MAC CE containing pre-configured resource numbers of released pre-configured resources, and the MAC CE is used to instruct to release pre-configured resources corresponding to the pre-configured resource numbers; or
sending, by the network-side device, reconfiguration information containing pre-configured resources with same numbers as current pre-configured resources to the terminal through RRC signaling, so that the terminal releases pre-configured resources corresponding to the pre-configured resource numbers according to the reconfiguration information and determines new pre-configured resources according to the reconfiguration information; or
releasing, by the network-side device, pre-configured resources corresponding to the current pre-configured resource numbers through a new PDCCH command for activating pre-configured resources with same numbers as the current pre-configured resources, and activating pre-configured resources according to the new PDCCH command for activating pre-configured resources; or
sending, by the network-side device, a PDCCH command for releasing pre-configured resources to the terminal after activating the pre-configured resources, so that the terminal releases resources according to the PDCCH command for releasing pre-configured resources.

In the above method, the network-side device releases the pre-configured resources in the above manner, which can avoid the resource waste, and the manner in which the network-side device schedules resources is more flexible and the resource manageability is stronger.

In one embodiment, after the network-side device determines the resources used by the first data packet sent by the terminal, the method further includes:
releasing, by the network-side device, resources that are not enabled in the pre-configured resource period to the terminal.

In the above method, the network-side device releases the resources that are not enabled in the same pre-configured resource period, which can avoid the resource waste, and the manner in which the network-side device schedules resources is more flexible and the resource manageability is stronger.

In one embodiment, the network-side device determines the resources used by the first data packet sent by the terminal in a following way:

using, by the network-side device, resources corresponding to the maximum transmit power of the terminal on the multiple continuous resources in the pre-configured resource period as the resources used by the terminal to send the first data packet; or using, by the network-side device, resources carrying a data packet containing indication information sent by the terminal among the pre-configured multiple continuous resources as the resources used by the terminal to send the first data packet; and the indication information is carried by an MAC layer, and the indication information is an MAC CE or carried by an MAC subheader carrying a dedicated indication LCID.

In one embodiment, determining, by the network-side device, multiple continuous resources that need to be configured for the terminal in the pre-configured resource period among pre-configured resources of the terminal, includes:

determining, by the network-side device, multiple continuous resources that need to be configured for the terminal according to auxiliary information reported by the terminal; and the auxiliary information includes some or all of: service arrival period, expected arrival time of service data, expected data packet size, deviation of expected arrival time of service data.

In another embodiment, a method for data transmission provided by an embodiment of the present application includes:

determining, by a terminal, multiple continuous resources pre-configured by a network-side device; and performing, by the terminal, data transmission through the pre-configured multiple continuous resources.

In one embodiment, the multiple continuous resources include:

continuous resources on adjacent symbols; or continuous resources on adjacent slots; or continuous resources on adjacent subframes; or adjacent continuous transmission resources in a same direction, i.e., resources that can be continuously sent or continuously received by a same terminal, including continuous uplink resources or continuous sidelink resources.

In one embodiment, determining, by the terminal, multiple continuous resources pre-configured by the network-side device, further includes:

determining, by the terminal, the number of multiple continuous resources in a pre-configured resource period among pre-configured resources according to a received RRC signaling used by the network-side device to configure the pre-configured resources, or determining the number of multiple continuous resources in the pre-configured resource period according to a protocol provision.

In one embodiment, the pre-configured multiple continuous resources belong to a pre-configured resource type 2; and determining, by the terminal, multiple continuous resources pre-configured by the network-side device, further includes:

determining, by the terminal, a quantity of multiple continuous resources in a pre-configured resource period according to a received PDCCH command for activating pre-configured resources sent by the network-side device.

In one embodiment, performing, by the terminal, data transmission through the pre-configured multiple continuous resources, further includes:

enabling, by the terminal, resources at a same position as resources used to send a first data packet in each pre-configured resource period after sending the first data packet through pre-configured resources; and other resources are invalid for the terminal except for the enabled resources in the multiple continuous resources within the pre-configured resource period.

In one embodiment, after the terminal performs data transmission through the pre-configured multiple continuous resources, the method further includes:

disabling, by the terminal, activated resources in each resource period in response to that no data is transmitted through pre-configured resources in next N resource periods after determining that the usage duration or usage number for disabling pre-configured resources configured by the network-side device through RRC signaling is reached or exceeded; or sending, by the terminal, indication information for disabling pre-configured resources to the network-side device after activating the pre-configured resources; and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources configured by the network-side device for the terminal roll back to the state where multiple continuous resources in the pre-configured resource period are restored to be activated and disabled.

In one embodiment, in response to that the pre-configured multiple continuous resources belong to a pre-configured resource type 1;

after the terminal performs data transmission through the pre-configured multiple continuous resources, the method further includes:

after receiving reconfiguration information containing pre-configured resources with same numbers as current pre-configured resources sent by the network-side device through RRC signaling, disabling, by the terminal, pre-configured resources corresponding to the pre-configured resource numbers according to the reconfiguration information, and determining new pre-configured resources according to the reconfiguration information.

In one embodiment, in response to that the pre-configured multiple continuous resources belong to a pre-configured resource type 2;

the method further includes:

disabling, by the terminal, activated resources in each resource period and releasing the pre-configured multiple continuous resources if no data is transmitted through pre-configured resources in next N resource periods after determining that the usage duration or usage number for releasing resources configured by the network-side device through RRC signaling is reached or exceeded; or releasing, by the terminal, the pre-configured multiple continuous resources after receiving a release command sent by the network-side device through MAC CE or RRC signaling; or deactivating, by the terminal, activated resources in the current pre-configured resources after receiving a deactivation command sent by the network-side device through a new PDCCH command for activating other pre-configured resources, and activating pre-configured resources corresponding to the new PDCCH command for activating other pre-configured resources;

releasing, by the terminal, the pre-configured multiple continuous resources after receiving a release command sent by the network-side device through a PDCCH command.

In one embodiment, sending, by the terminal, the first data packet through pre-configured resources, further includes:

putting, by the terminal, indication information indicating resources used for sending the first data packet in the first data packet.

In one embodiment, before the terminal determines the multiple continuous resources pre-configured by the network-side device, the method further includes:

sending, by the terminal, auxiliary information for determining multiple continuous resources that need to be configured for the terminal to the network-side device; and the auxiliary information includes some or all of: service arrival period, expected arrival time of service data, expected data packet size, deviation of expected arrival time of service data.

In one embodiment of the present application provides a network-side device for resource configuration, which includes: a processor, a memory and a transceiver;

and the processor is configured to read a program in the memory and perform followings:

determining multiple continuous resources in a set of pre-configured resources configured for a terminal, and the multiple continuous resources are within a pre-configured resource period; and pre-configure the determined multiple continuous resources for the terminal.

In a possible implementation, the multiple continuous resources include:

continuous resources on adjacent symbols; or
continuous resources on adjacent slots; or
continuous resources on adjacent subframes; or
adjacent continuous transmission resources in a same direction; and the adjacent continuous transmission resources in the same direction refer to resources continuously sent or continuously received by a same terminal, and include continuous uplink resources or continuous sidelink resources.

In a possible implementation, the processor is further configured to:

configure the number of continuous resources in a resource period for the terminal through RRC signaling used to configure pre-configured resources.

In a possible implementation, the processor is further configured to:

configure the number of continuous resources in a resource period for the terminal through a PDCCH command used to activate pre-configured resources in response to that it is determined that resources that need to be configured for the terminal belong to a pre-configured resource type 2.

In a possible implementation, the processor is further configured to:

determine resources used by a first data packet sent by the terminal on the pre-configured resources and enable resources at a same position in each pre-configured resource period after pre-configuring the determined multiple continuous resources for the terminal; and other resources are invalid for the terminal except for the enabled resources in the multiple continuous resources within the pre-configured resource period.

In a possible implementation, the processor is further configured to:

configure a usage duration or usage number for disabling pre-configured resources for the terminal through RRC signaling; or receive indication information for disabling pre-configured resources sent by the terminal after the pre-configured resources are enabled, and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources of the terminal roll back to a state where there are multiple continuous resources in a pre-configured resource period and the resources are activated and disabled.

In a possible implementation, the processor is further configured to:

in response to that it is determined that resources that need to be configured for the terminal belong to a pre-configured resource type 1, send reconfiguration information containing pre-configured resources with same numbers as current pre-configured resources to the terminal through RRC signaling; and disable pre-configured resources corresponding to the pre-configured resource numbers according to the reconfiguration information, and determine new pre-configured resources according to the reconfiguration information.

In a possible implementation, the processor is further configured to:

in response to that it is determined that resources that need to be configured for the terminal belong to a pre-configured resource type 2, configure a usage duration or usage number for releasing pre-configured resources for the terminal through RRC signaling after pre-configured multiple continuous resources for the terminal, so that the terminal releases resources according to the usage duration or usage number for releasing pre-configured resources; or receive indication information for releasing pre-configured resources sent by the terminal after activating the pre-configured resources, and the indication information is an MAC subheader containing an LCID indicating the release of pre-configured resources, or the indication information is an MAC CE containing pre-configured resource numbers of released pre-configured resources, and the MAC CE is used to instruct to release pre-configured resources corresponding to the pre-configured resource numbers; or send reconfiguration information containing pre-configured resources with same numbers as current pre-configured resources to the terminal through RRC signaling, so that the terminal releases pre-configured resources corresponding to the pre-configured resource numbers according to the reconfiguration information and determines new pre-configured resources according to the reconfiguration information; or release pre-configured resources corresponding to the current pre-configured resource numbers through a new PDCCH command for activating pre-configured resources with same numbers as the current pre-configured resources, and activate pre-configured resources according to the new PDCCH command for activating pre-configured resources; or send a PDCCH command for releasing pre-configured resources to the terminal after activating the pre-configured resources, so that the terminal releases resources according to the PDCCH command for releasing pre-configured resources.

In a possible implementation, the processor is further configured to:

release resources that are not enabled in the pre-configured resource period to the terminal.

In a possible implementation, the processor is further configured to determine the resources used by the first data packet sent by the terminal in a following way:

use resources corresponding to the maximum transmit power of the terminal on the multiple continuous resources in the pre-configured resource period as the resources used by the terminal to send the first data packet; or use resources carrying a data packet containing indication information sent by the terminal among the pre-configured multiple continuous resources as the resources used by the terminal to send the first data packet;

and the indication information is carried by an MAC layer, and the indication information is an MAC CE or carried by an MAC subheader carrying a dedicated indication LCID.

In a possible implementation, the processor is specifically configured to:

determine multiple continuous resources that need to be configured for the terminal according to auxiliary information reported by the terminal;

and the auxiliary information includes some or all of:

service arrival period, expected arrival time of service data, expected data packet size, deviation of expected arrival time of service data.

In one embodiment of the present application provides a user equipment for resource configuration, which includes: a processor, a memory and a transceiver;

and the processor is configured to read a program in the memory and perform:

determine multiple continuous resources pre-configured by a network-side device; and perform data transmission through the pre-configured multiple continuous resources.

In a possible implementation, the multiple continuous resources include:

continuous resources on adjacent symbols; or
continuous resources on adjacent slots; or
continuous resources on adjacent subframes; or
adjacent continuous transmission resources in a same direction refer to resources that are continuously sent or continuously received by a same terminal, and include continuous uplink resources or continuous sidelink resources.

In a possible implementation, the processor is further configured to:

determine a quantity of multiple continuous resources in a pre-configured resource period among pre-configured resources according to a received RRC signaling used by the network-side device to configure the pre-configured resources, or determining a quantity of multiple continuous resources in the pre-configured resource period according to a protocol provision.

In a possible implementation, the processor is further configured to:

in response to that the pre-configured multiple continuous resources belong to a pre-configured resource type 2, determine a quantity of multiple continuous resources in a pre-configured resource period according to a received PDCCH command for activating pre-configured resources sent by the network-side device.

In a possible implementation, the processor is further configured to:

enable resources at a same position as resources used to send a first data packet in each pre-configured resource period after sending the first data packet through pre-configured resources; and other resources are invalid for the terminal except for the enabled resources in the multiple continuous resources within the pre-configured resource period.

In a possible implementation, the processor is further configured to:

disable activated resources in each resource period in response to that no data is transmitted through pre-configured resources in next N resource periods after determining that the usage duration or usage number for disabling pre-configured resources configured by the network-side device through RRC signaling is reached or exceeded; or send indication information for disabling pre-configured resources to the network-side device after activating the pre-configured resources; and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources configured by the network-side device for the terminal roll back to a state where multiple continuous resources in the pre-configured resource period are restored to be activated and disabled.

In a possible implementation, the processor is further configured to:

in response to that the pre-configured multiple continuous resources belong to a pre-configured resource type 1, and after receiving reconfiguration information containing pre-configured resources with same numbers as current pre-configured resources sent by the network-side device through RRC signaling, disable pre-configured resources corresponding to the pre-configured resource numbers according to the reconfiguration information, and determine new pre-configured resources according to the reconfiguration information.

In a possible implementation, the processor is further configured to:

in response to that the pre-configured multiple continuous resources belong to a pre-configured resource type 2, disable activated resources in each resource period and release the pre-configured multiple continuous resources if no data is transmitted through pre-configured resources in next N resource periods after determining that the usage duration or usage number for releasing resources configured by the network-side device through RRC signaling is reached or exceeded; or release the pre-configured multiple continuous resources after receiving a release command sent by the network-side device through MAC CE or RRC signaling; or deactivate activated resources in the current pre-configured resources after receiving a deactivation command sent by the network-side device through a new PDCCH command for activating other pre-configured resources, and activate pre-configured resources corresponding to the new PDCCH command for activating other pre-configured resources;

release the pre-configured multiple continuous resources after receiving a release command sent by the network-side device through a PDCCH command.

In a possible implementation, the processor is further configured to:

put indication information indicating resources used for sending the first data packet in the first data packet.

In a possible implementation, the processor is further configured to:

send auxiliary information for determining multiple continuous resources that need to be configured for the terminal to the network-side device;

and the auxiliary information includes some or all of:

service arrival period, expected arrival time of service data, expected data packet size, deviation of expected arrival time of service data.

In one embodiment of the present application further provides a computer storage medium storing a computer program thereon, where the program, when executed by a processor, implements the steps of any method in direct communication.

BRIEF DESCRIPTION OF THE DRAWINGS

Embodiments of the present application as described more clearly, the accompanying figures which need to be used in describing the embodiments will be introduced below briefly.

Figure 16:
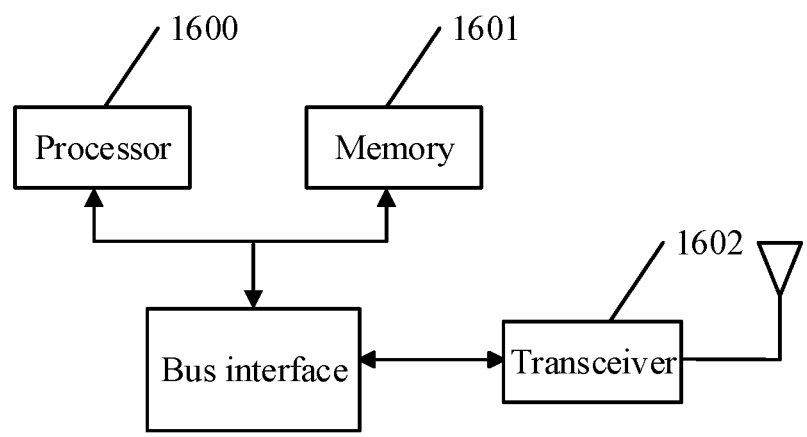
Figure 17:
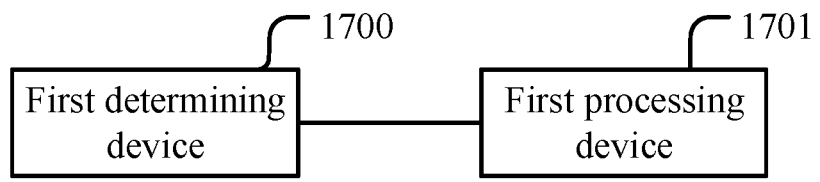
Figure 18:
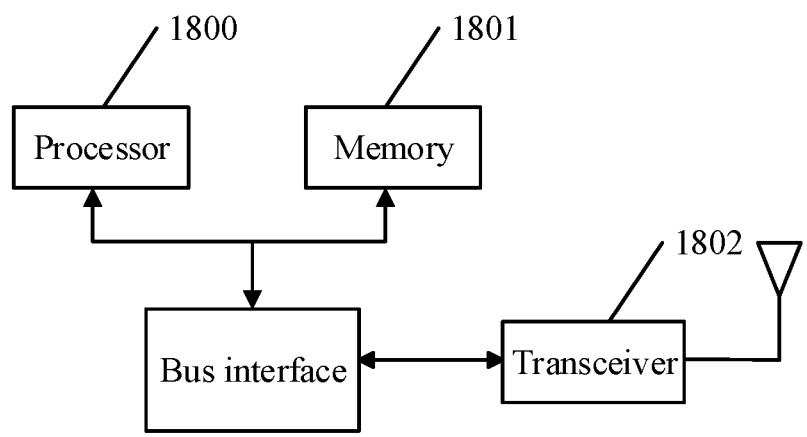
Figure 19:
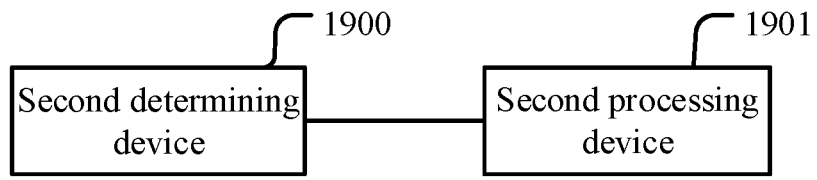
Figure 20:
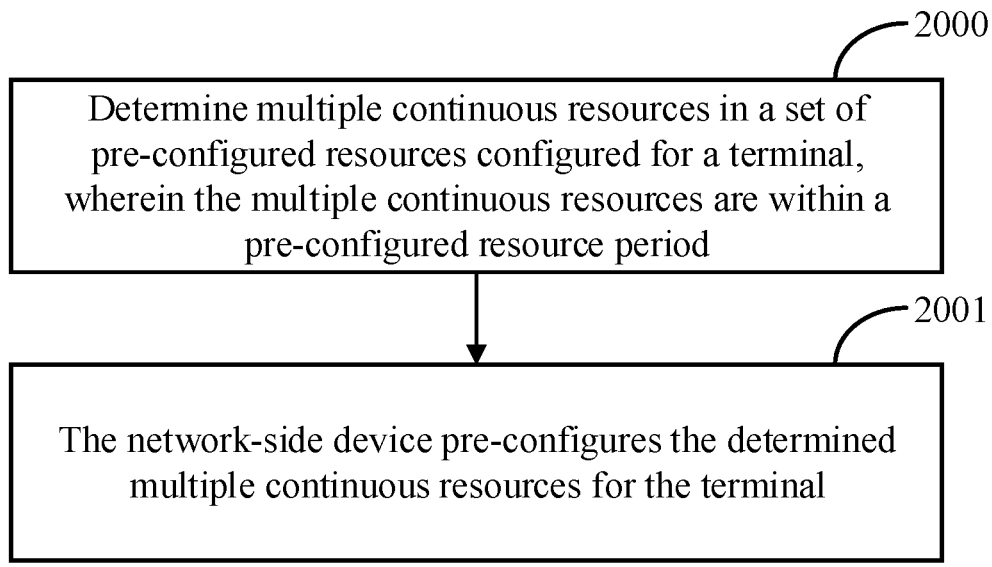
Figure 21:
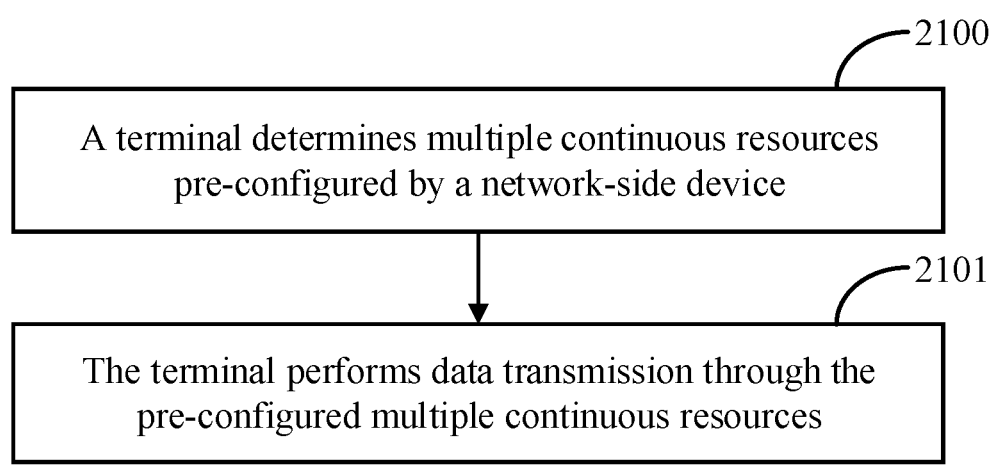

15 is a schematic diagram of a scenario where pre-configured resources are released according to a new PDCCH command for activating pre-configured resources provided by an embodiment of the present application;

FIG. 16 is a structural schematic diagram of a network-side device for resource configuration provided by an embodiment of the present application;

FIG. 17 is a structural schematic diagram of another network-side device for resource configuration provided by an embodiment of the present application;

FIG. 18 is a structural schematic diagram of a terminal for data transmission provided by an embodiment of the present application;

FIG. 19 is a structural schematic diagram of another terminal for data transmission provided by an embodiment of the present application;

FIG. 20 is a schematic flowchart of a method for resource configuration provided by an embodiment of the present application;

FIG. 21 is a schematic flowchart of a method for data transmission provided by an embodiment of the present application.

DETAILED DESCRIPTION OF THE EMBODIMENTS

Embodiments of the present application will be further illustrated below in details with reference to the accompanying figures. The described embodiments are merely a part of the embodiments of the present application but not all the embodiments.

Some words that appear herein will be explained below.

1. "and/or" describes the association relationship of the associated objects, and indicates that there may be three relationships, for example, A and/or B may represent: only A, both A and B, and only B. The character "/" generally indicates that the associated objects have a kind of "or" relationship.

2. The "URLLC scenario" in the embodiments of the present application is suitable for industrial application and control, traffic safety and control, remote manufacturing, remote train, and remote surgery. This scenario requires the end-to-end latency to reach 0.5 ms (milliseconds).

3. The "pre-configured resource type 1" in the embodiments of the present application: when the network-side device configures the resources of the pre-configured resource type 1 for a terminal, the resource configuration will take effect, and the terminal can use this resource for data transmission with no need for the network-side device to use an additional instruction to activate.

4. "Activation" in the embodiments of the present application refers to the action for the pre-configured resource type 2, where the network-side device needs to activate the resources of pre-configured resource type 2 through a PDCCH command, and the terminal can only use the activated resources of pre-configured resource type 2 for data transmission.

5. The "terminal" in embodiments of the present application is a mobile phone, a platform, etc.

6. The "network-side device" in embodiments of the present application is a macro base station, a micro base station, etc.

There are two ways to pre-configure resources, which are called pre-configured resource type 1 (configured grant Type 1) and pre-configured resource type 2 (configured grant Type 2) in the 3GPP protocol.

Figure 1:
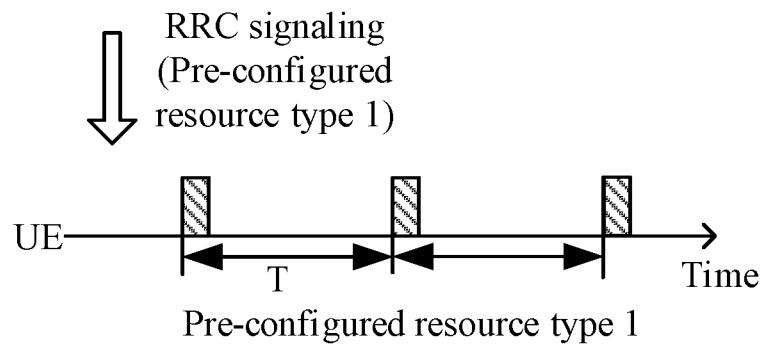
FIG. 1 is a schematic diagram of an existing scenario where the pre-configured resource type 1 is configured.

The configured grant Type 1: the network side configures periodic resources for a terminal through RRC signaling, and the network side informs the terminal in detail of the pre-configured resource period of the pre-configured resources, the starting position of the pre-configured resources, transmission resources (time-frequency resources, etc.), and transmission format (MCS, etc.). The pre-configured resource configuration takes effect. After receiving the configuration command sent by the network side, the terminal can immediately use the periodic resources for data transmission. As shown in FIG. 1, it is a schematic diagram of a scenario where a network-side device configures the pre-configured resource type 1 for a terminal.

Figure 2:
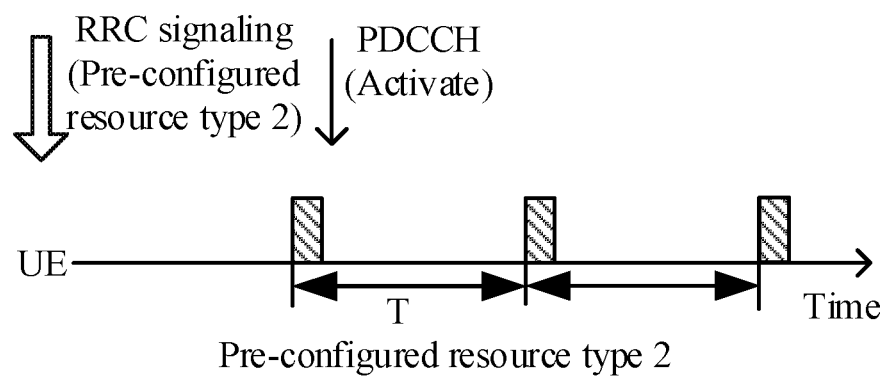
FIG. 2 is a schematic diagram of an existing scenario where the pre-configured resource type 2 is configured.

The configured grant Type 2: the network side allocates the cycle of the periodic resources and the CS-RNTI used to schedule the periodic resources to the terminal through RRC signaling. When the network side decides to allocate actual resources, it sends a PDCCH command to indicate the starting point of periodic resources, specific transmission resources (time-frequency resources, etc.), and transmission format (MCS, etc.). The terminal has no available resource when receiving the RRC signaling of pre-configured resources, and are actually allocated with the pre-configured resources after receiving the PDCCH activation command. As shown in FIG. 2, it is a schematic diagram of a scenario where a network-side device configures the pre-configured resource type 2 for a terminal.

Figure 3:
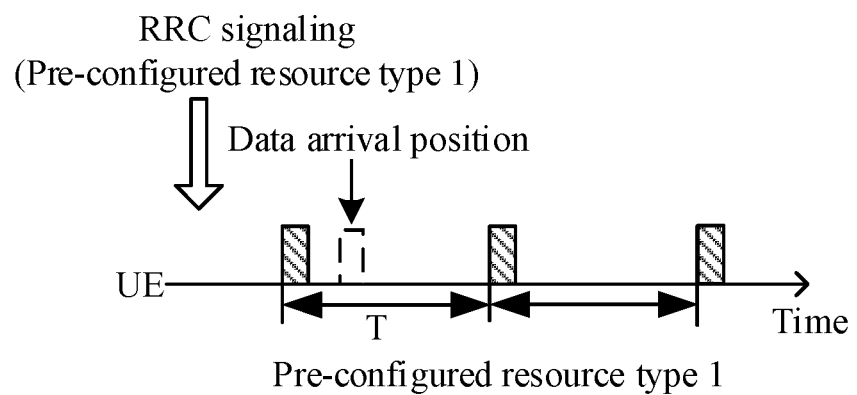
FIG. 3 is a schematic diagram of an existing scenario where pre-configured resources cause transmission delay.

When the network-side device allocates pre-configured resources to the terminal, the network-side device may estimate the starting point of resources, which is roughly aligned with the terminal's service, or the terminal may estimate the time when the data arrives and report the service model. The network-side device and terminal negotiates the starting point of pre-configured resources configured for the terminal. When the terminal's data arrives, the terminal can use the pre-configured resources to report the data. However, the starting point of pre-configured resources is difficult to match with the data arriving at the terminal, so the terminal may need to wait for the next pre-configured resource period to send the data, as shown in the scenario of FIG. 3.

The resulting transmission delay has no effect on the general scenarios with low delay requirement, but for the scenarios with strict delay requirement, such as an important test scenario—URLLC scenario proposed in the 5G technology, which is suitable for industrial application and control, traffic safety and control, remote manufacturing, remote train, and remote surgery. This scenario requires the end-to-end latency to reach 0.5 ms (milliseconds). The transmission delay due to the difficulty of the existing pre-configured resources to match with the data arriving at the terminal may cause the above scenario to fail to meet the delay requirement.

Therefore, the embodiments of the present application proposes a method and device for resource configuration and data transmission. A network-side device configures pre-configured resources for a terminal in advance, and there are multiple continuous resource allocations in one pre-configured resource period of a set of pre-configured resources. Even if the starting point of the pre-configured resources does not match with the starting point of the data that will arrive at the terminal, the terminal can still select the closest resource among multiple continuous resources for data transmission. The embodiments of the present application will be further described in detail below in combination with the accompanying drawings of the specification.

Figure 4:
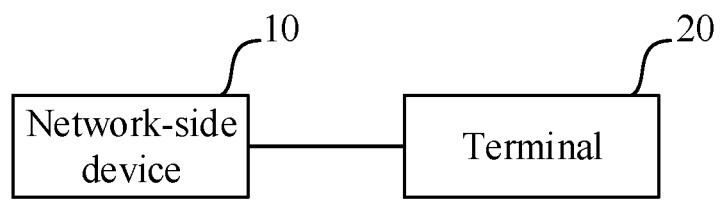
FIG. 4 is a structural schematic diagram of a system for resource configuration and data transmission provided by an embodiment of the present application.

As shown in FIG. 4, an embodiment of the present application provides a system for resource configuration and data transmission. The system includes: a network-side device 10 and a terminal 20.

The network-side device 10 is configured to: determine multiple continuous resources in a pre-configured resource period in a set of pre-configured resources configured for the terminal; and pre-configure the determined multiple continuous resources for the terminal.

The terminal 20 is configured to: determine multiple continuous resources pre-configured by a network-side device; and perform data transmission through the pre-configured multiple continuous resources.

With the above-mentioned method, the network-side device configures the pre-configured resources for the terminal in advance, and there are multiple continuous resource allocations in one pre-configured resource period of a set of pre-configured resources. When the data arrives at the terminal, one of the multiple consecutive pre-allocated resources is selected for data transmission. Even if the starting point of the pre-configured resources does not match with the starting point of the data that will arrive at the terminal, the terminal can still select the closest resource among multiple continuous resources for data transmission, thus reducing the transmission delay.

The configuration processes of the pre-configured resource type 1 and pre-configured resource type 2 will be introduced below.

I. The process of the network-side device to configure pre-configured resources.

1. The process of configuring the pre-configured resource type 1: the network-side device configures pre-configured resources for the terminal according to the auxiliary information such as the service arrival period reported by the terminal, the expected arrival time of the service data, the expected data packet size, the deviation of the expected arrival time of the service data, etc., and determines the time starting point of the first resource period of pre-configured resources, the location of time-frequency resources, the transmission format and others for each set of pre-configured resources. Here, the deviation of the expected arrival time of the service data is understood as: the deviation of the expected arrival time of the service data may be positive or negative, and the unit of the deviation value may be symbol, slot, subframe or millisecond. The network-side device determines the number of multiple continuous resources in a pre-configured resource period according to the expected arrival time of the service data and the deviation of the expected arrival time of the service data.

Figure 5:
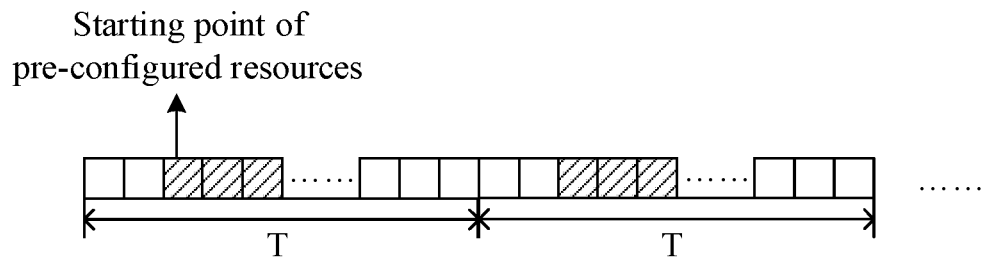
FIG. 5 is a schematic diagram of a scenario where the number of continuous resources is determined provided by an embodiment of the present application.

For example, as shown in FIG. 5, the terminal reports that the expected arrival time of service data is the 3rd symbol of subframe N and the deviation of the expected arrival time of the service data is 2 positive symbols, and then the network-side device determines that the service data of the terminal may arrive in delay of 2 symbols, so the network-side device determines that the number of multiple continuous resources in a pre-configured resource period is at least 3, specifically: the starting point is the 3rd symbol of subframe N, 3 resources are continuously allocated, and the service period is set to T subframe, so 3 resources starts to be pre-allocated from the 3rd symbol of each subframe N+kT.

The network-side device indicates the number of continuous resources in a pre-configured resource period through RRC signaling.

2. The process of configuring the pre-configured resource type 2: the network-side device configures pre-configured resources for the terminal according to the auxiliary information such as the service arrival period reported by the terminal, the expected arrival time of the service data, the expected data packet size, the deviation of the expected arrival time of the service data, etc., and determines the time starting point of the first resource period of pre-configured resources, the location of time-frequency resources, the transmission format and others for each set of pre-configured resources, and the manner to determine the number of continuous resources can refer to the above manner, which will not be repeated here. The network-side device indicates the number of continuous resources in a pre-configured resource period in the pre-configured resource type 2 in the following way.

In a first indication way: indicate through RRC signaling.

The network-side device can configure and indicate the number of continuous resources in a pre-configured resource period for the terminal through RRC signaling.

In a second indication way: indicate through a PDCCH command for activating pre-configured resources.

The network-side device may indicate the number of continuous resources in a pre-configured resource period through the PDCCH command for activating pre-configured resources.

In the embodiments of the present application, regardless of whether it is pre-configured resource type 1 or pre-configured resource type 2, there are multiple continuous resources in a pre-configured resource period in a set of pre-configured resources configured by the network-side device for the terminal. The "multiple continuous resources" may be understood as follows:
1. continuous resources on adjacent symbols;
2. continuous resources on adjacent slots;
3. continuous resources on adjacent subframes;
4. adjacent continuous transmission resources in the same direction.

Figure 6:
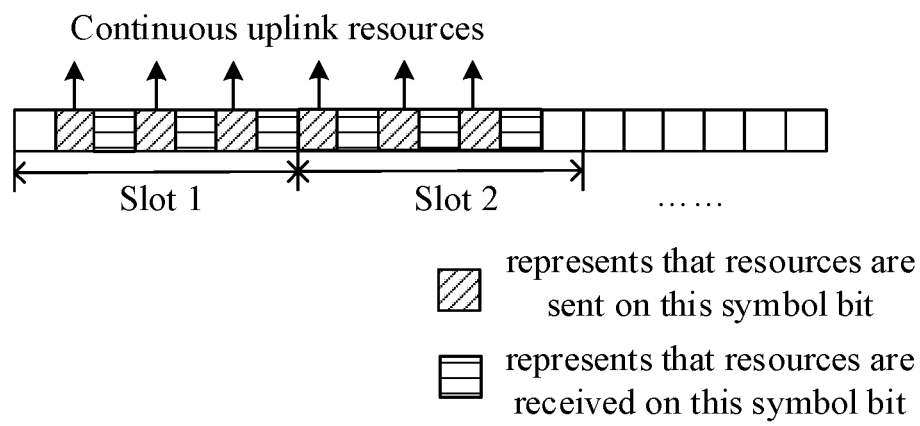
FIG. 6 is a schematic diagram of adjacent continuous transmission resources in the same direction provided by an embodiment of the present application.

As shown in FIG. 6, adjacent continuous transmission resources in the same direction refer to resources continuously sent or continuously received by the same terminal, including continuous uplink resources or continuous sidelink resources.

If the adjacent continuous transmission resources in the same direction are sidelink resources, the pre-configured resources are configured by the network-side device for the transmitting terminal and the receiving terminal to transmit on the sidelink interface.

II. The process of enabling pre-configured resources and releasing other pre-configured resources in the same period.

The terminal receives the RRC signaling used by the network-side device to configure the pre-configured resources, and determines multiple continuous resources configured by the network-side device. The multiple continuous resources in a pre-configured resource period of the pre-configured resources can be considered to be reserved for the terminal. When determining that the service data arrives, the terminal selects a resource on the pre-configured resources for data reporting. After determining that the terminal uses the pre-configured resource to send a first data packet, the network-side device enables the resource at the same position in each pre-configured resource period, and other pre-configured resources in the same pre-configured resource period become invalid. The network-side device releases the disabled resources among the multiple pre-configured resources to the terminal, and there is only one enabled resource in each pre-configured resource period. Then the terminal can perform data transmission on the enabled resource.

Here, the network-side device determines the resource position of the first data packet sent by the terminal in the following way.

In a first determining way: determine according to the transmit power value of the terminal on the pre-configured resource;
 the network-side device performs the power detection, and determines that the resource corresponding to the maximum transmit power of the terminal on the multiple pre-configured resources is the resource used by the terminal to send the first data packet.

In a second determining way: determine according to the decoded data packet;
 the network-side device receives the reported information of the terminal and decodes the reported information. The network-side device can determine the pre-configured resource used by the terminal to send the first data packet according to whether the data packet is decoded. If the network-side device decodes the data packet, it is determined that the resource used by the terminal to report the information this time is the resource used by the terminal to send the first data packet.

In a third determining way: determine according to the indication information reported by the terminal;
 the terminal carries the indication information in a data transmission packet, and selects one of the pre-configured multiple continuous resources for data reporting. The network-side device uses the resource carrying the data packet containing the indication information sent by the terminal among the pre-configured multiple continuous resources as the resource used by the terminal to send the first data packet.

Here, the indication information is carried by an MAC layer, and the indication information is an MAC CE or carried by an MAC subheader carrying a dedicated indication LCID.

Figure 7:
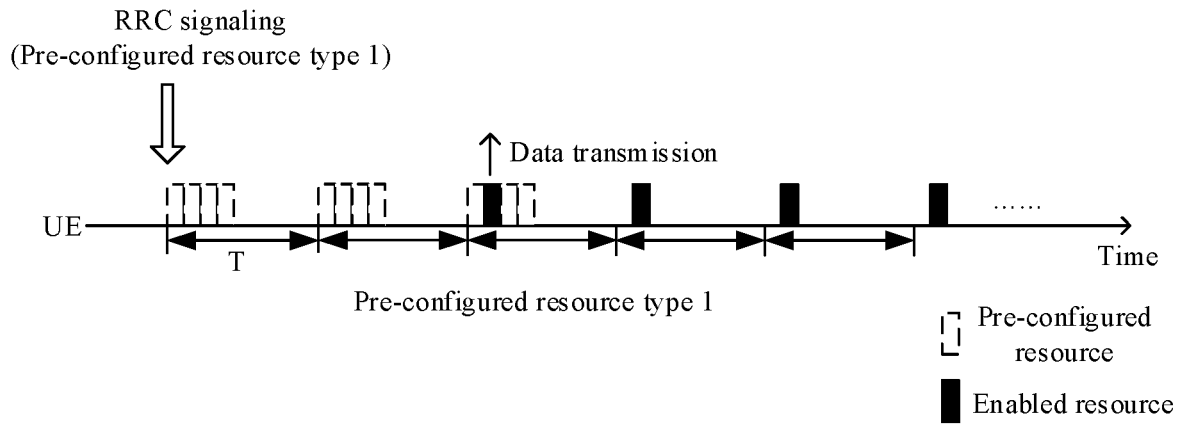
FIG. 7 is a schematic diagram of a scenario where the pre-configured resource type 1 is configured and enabled provided by an embodiment of the present application.

Here, for the pre-configured resource type 1, as shown in FIG. 7, it is a schematic diagram of a scenario of the configuration and enablement of the pre-configured resource type 1.

Here, T is the pre-configured resource period, and there are 4 continuous resources in a pre-configured resource period. For the pre-configured resource type 1, the network-side device takes effect after configuring through RRC signaling. When the terminal's data arrives, the terminal selects the resource closest to the arrival time from multiple continuous resources to send data. After determining that the terminal sends a first data packet on the pre-configured resource, the network-side device enables the resource at the same position as the resource used by the terminal to send the first data packet in each pre-configured resource period, and other pre-configured resources become invalid. The network-side device releases the disabled resources among the multiple pre-configured resources to the terminal, and then the terminal performs the data transmission on the enabled resources.

Figure 8:
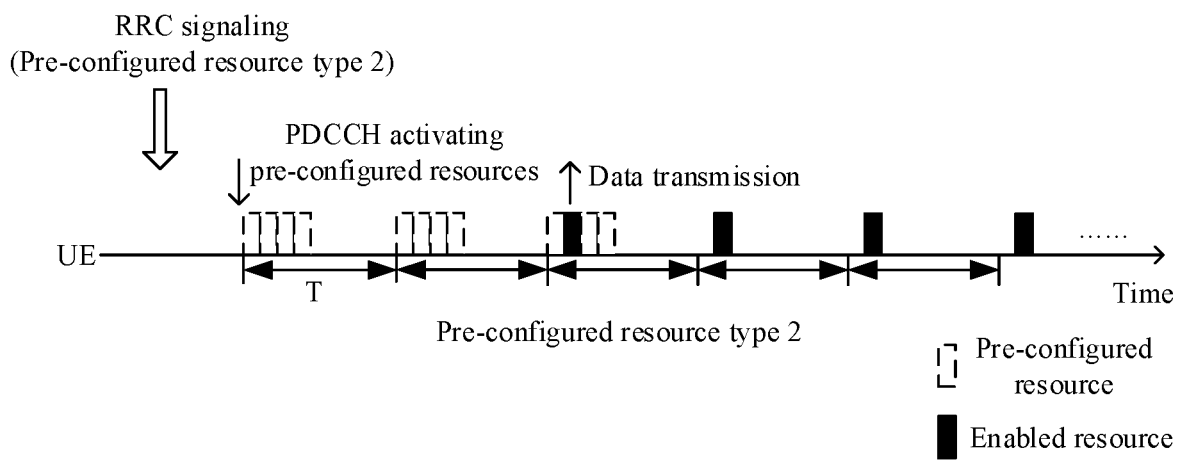
FIG. 8 is a schematic diagram of a scenario where the pre-configured resource type 2 is configured and enabled provided by an embodiment of the present application.

For the pre-configured resource type 2, as shown in FIG. 8, it is a schematic diagram of a scenario where the network-side device configures and enables the pre-configured resource type 2 for the terminal.

Here, T is the pre-configured resource period, and there are 4 continuous resources in a pre-configured resource period. The difference from the pre-configured resource type 1 is: for the pre-configured resource type 2, the network-side device further needs to activate resources through a PDCCH command for activating the pre-configured resources after configuring through the RRC signaling, and the activated resources can be used by the terminal. When the terminal's data arrives, the resource closest to the arrival time is selected from multiple activated continuous resources to send the data. After determining the resource used by the terminal to send the first data packet, the resource at the same resource position in each pre-configured resource period is enabled, and other pre-configured resources become invalid. The network-side device releases the disabled resources among multiple pre-configured resources to the terminal, and the terminal performs the data transmission on the enabled resources. The disabled resources may be configured for use by other terminals or may be dynamically scheduled to the terminal.

III. The process of disabling pre-configured resources.

After enabling the pre-configured resources, there is only one enabled pre-configured resource in a pre-configured resource period, and the terminal transmits data on the enabled pre-configured resource. If the disabling condition configured by the network-side device is met, for example, the terminal has not sent data on the enabled pre-configured resource for a long time, then the enabled resource will be disabled, that is, roll back to the activated and disenabled state.

The disabling ways for the pre-configured resource type 1 and pre-configured resource type 2 are introduced as follows.

In a first disabling way: disable pre-configured resources through a timer or counter.

Figure 9:
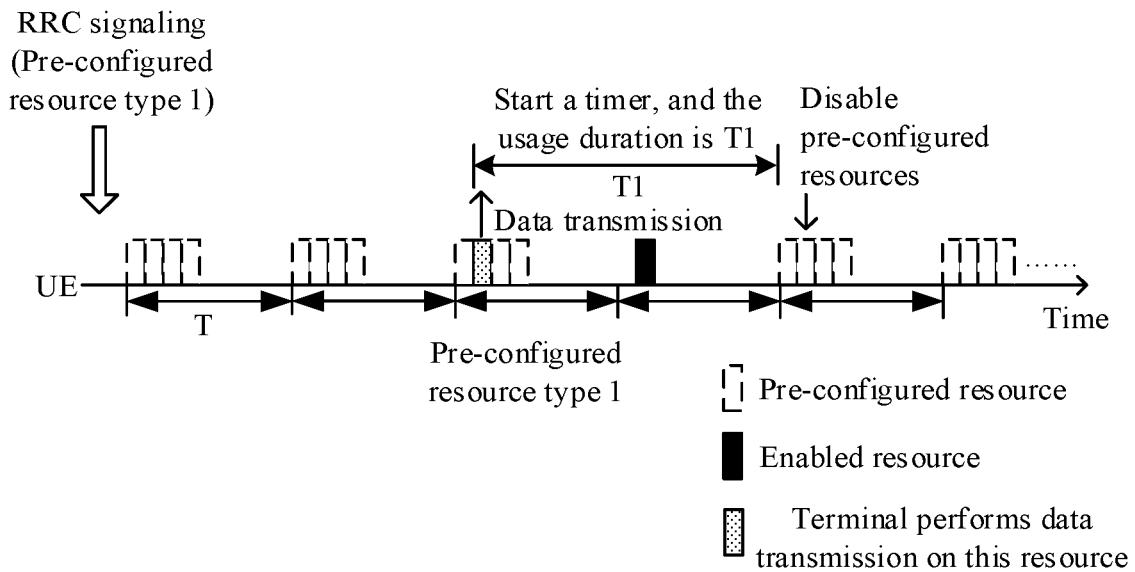
FIG. 9 is a schematic diagram of a scenario where pre-configured resources are disabled according to a timer provided by an embodiment of the present application.

Taking the timer as an example to introduce: the network-side device sets the usage duration for disabling pre-configured resources through the timer, and the terminal starts or restarts the timer while sending a first data packet on the pre-configured resource before the pre-configured resources are activated but not enabled; if the terminal does not send data on the enabled pre-configured resource in subsequent N pre-configured resource periods after the timer reaches the duration for disabling, the terminal considers the pre-configured resource is disabled, that is, the terminal does not send data through this resource. Assuming that N is 1, FIG. 9 is a schematic diagram of a scenario where the network-side device disables the pre-configured resource type 1 through a timer. FIG. 9 distinguishes the enabled resources and the data transmission on the enabled resources. Here, the enabled resources are enabled but the terminal does not perform data transmission on the resources, which are the same as in FIGS. 10 and 11 and will not be described in detail below.

After the duration of the timer reaches the usage duration for disabling pre-configured resources, the terminal determines whether to disable the pre-configured resources according to whether the terminal sends data within one pre-configured resource period after the usage duration is exceeded. If the terminal sends data on the enabled resources in one subsequent pre-configured resource period, the pre-configured resources are not disabled. If the terminal has no service data in the subsequent pre-configured resource period, that is, the terminal will no longer send data through the pre-configured resources, it is considered that the pre-configured resources are disabled, that is, roll back to a state where there are multiple continuous resources in a pre-configured resource period.

Figure 10:
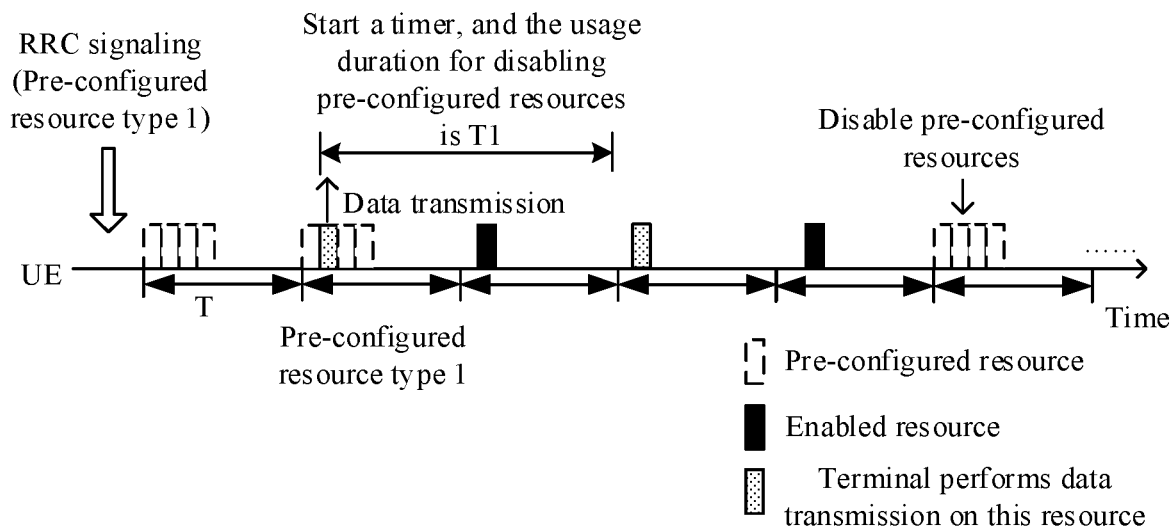
FIG. 10 is a schematic diagram of another scenario where pre-configured resources are disabled according to a timer provided by an embodiment of the present application.

For another example, if N is a positive integer greater than 1 (assuming that N is 2), it is considered that the pre-configured resources are disabled if the terminal does not send data through the enabled resources in the next two pre-configured resource periods after the terminal determines that the usage duration for disabling pre-configured resources is reached or exceeded. As shown in FIG. 10, it is a schematic diagram of a scenario where the network-side device disables the pre-configured resource type 1 through a timer when N is 2. The terminal determines whether to disable the pre-configured resources according to whether the terminal sends data within two pre-configured resource periods after the usage duration is exceeded. If the terminal sends data on the enabled resources in the first subsequent pre-configured resource period, the pre-configured resources are not disabled. If the terminal has no service data in two subsequent pre-configured resource periods (the second pre-configured resource period and the third pre-configured resource period after T1 is exceeded), that is, the terminal will no longer send data through the pre-configured resources, the pre-configured resources are disabled in the second pre-configured resource period in which the pre-configured resources are not used to send data, that is, roll back to a state where there are multiple continuous resources in a pre-configured resource period.

The network-side device can also set the usage number for disabling pre-configured resources through a counter, and the specific execution method of the counter can refer to the method steps of the above-mentioned timer, which will not be repeated here.

Here, the usage duration or usage number for disabling may be specified by the protocol, or configured by the network-side device for the terminal through RRC signaling. For example, the network-side device indicates the usage time for disabling by the RRC signaling for configuring pre-configured resources.

Figure 11:
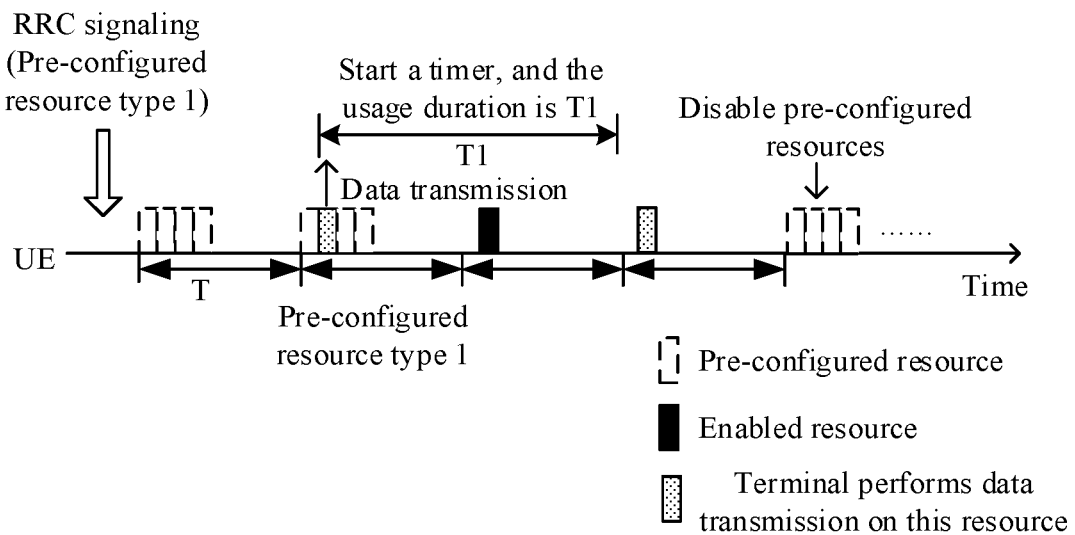
FIG. 11 is a schematic diagram of a third scenario where pre-configured resources are disabled according to a timer provided by an embodiment of the present application.

It should be noted that, if the terminal still has service transmission requirements after the duration of the timer reaches the usage duration for disabling pre-configured resources or the amount of data sent using the pre-configured resources reaches the usage number for disabling pre-configured resources, the terminal may further continue to send data on subsequent pre-configured resources, until the terminal no longer sends data through the pre-configured resources, and then it is considered that the pre-configured resources are disabled, as in the scene shown in FIG. 11.

In a second disabling way: disable pre-configured resources through a disabling command carried by the MAC layer.

The network-side device receives the indication information for disabling pre-configured resources sent by the terminal, where the indication information is an MAC subheader containing an LCID indicating the disabling of pre-configured resources, or the network-side device disables the pre-configured resources corresponding to the pre-configured resource numbers through the pre-configured resource numbers of disabled pre-configured resources carried in the MAC CE.

Here, if the LCID in the MAC subheader instruct to disable the pre-configured resources, the value of the LCID in the MAC sub-header may be the specified value instructing to disable the pre-configured resources in the protocol. If the value of the LCID in the MAC subheader sent by the terminal is the specified value to disable pre-configured resources, the network-side device determines to disable the pre-configured resources configured by the terminal, and the format of the specific MAC sub-PDU is the part that does not include the MAC CE in FIG. 11.

Figure 12:
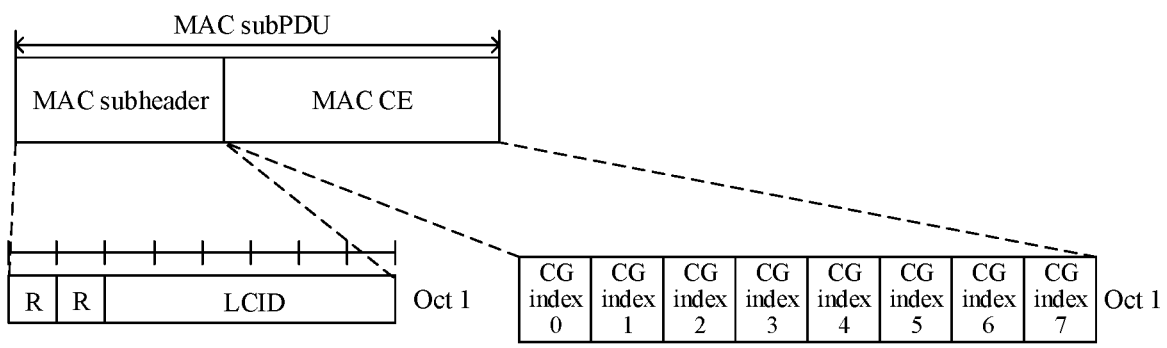
FIG. 12 is a structural schematic diagram of an MAC CE provided by an embodiment of the present application.

If the indication information is an MAC CE, as shown in FIG. 12, and the CG (Configured Grant) index is a pre-configured resource number, the MAC CE may use the MAC subheader in the above mode, and the MAC subheader may carry the indication that the corresponding MAC CE is the MAC CE for disabling pre-configured resources, and the pre-configured resources corresponding to the pre-configured resource numbers are disabled according to the pre-configured resource numbers of disabled pre-configured resources carried in the MAC CE. FIG. 11 is an example. The number of bits indicating the pre-configured resource number in a specific MAC CE can be adjusted as needed.

For example, the pre-configured resource number of the pre-configured resource configured by the network-side device for the terminal is 3. The terminal places the pre-configured resource number 3 in the MAC CE1, and the indication that the MAC CE for disabling pre-configured resources is MAC CE1 is carried by the LCID in the MAC subheader, so the network-side device disables the pre-configured resource corresponding to the pre-configured resource number 3 according to the indication information carried by the received MAC CE1, and the pre-configured resource number in the MAC CE1 corresponds to the pre-configured resource that needs to be disabled, and also the pre-configured resource that needs to be disabled may be determined by configuring the value of the pre-configured resource number. For example, the value of the CG index3 in the MAC CE in FIG. 11 is set to 1 (or set to 0) to indicate that the pre-configured resource with the pre-configured resource number of 3 is disabled.

It should be noted that, for the pre-configured resource type 1, the network-side device disables the pre-configured resources in the following way.

In a third disabling way: disable pre-configured resources through RRC signaling.

The network-side device reconfigures the pre-configured resources with the same pre-configured resource number through RRC signaling, and the currently enabled pre-configured resources with the same pre-configured resource number are disabled.

Figure 13:
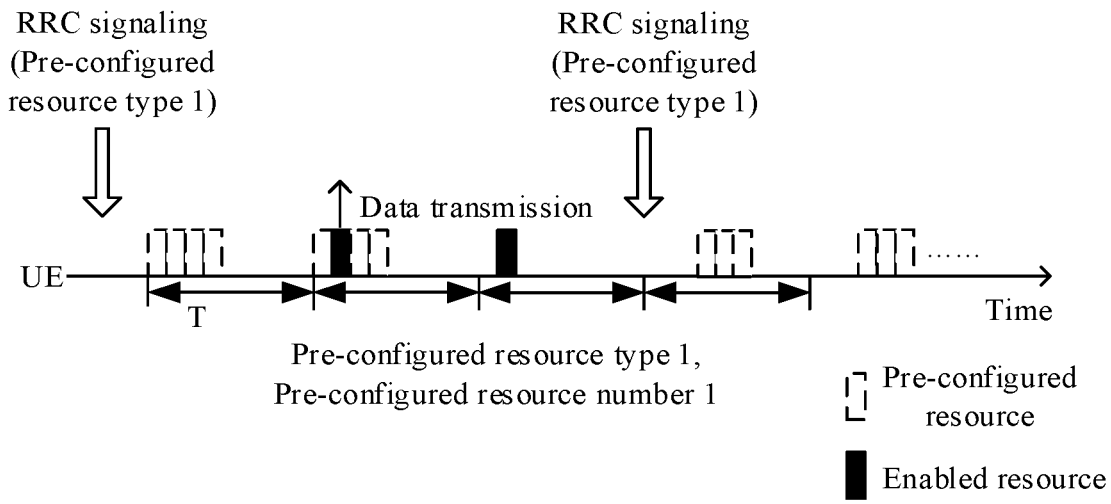
FIG. 13 is a schematic diagram of another scenario where a network-side device disables pre-configured resources provided by an embodiment of the present application.

For example, as shown in FIG. 13, the network-side device configures the pre-configured resource with the pre-configured resource number of 1 for the terminal, and the terminal sends data on the pre-configured resource. There is one enabled resource in a pre-configured resource period of the pre-configured resources. When the network-side device reconfigures the pre-configured resource with the pre-configured resource number of 1 again through RRC signaling, the current resource with the pre-configured resource number of 1 is disabled, and the new pre-configured resources are determined according to the RRC signaling for re-configuring the pre-configured resources, and the pre-configured resource number directs at a set of pre-configured resources, and is distinguished from the resource number of the pre-configured resource below, where the resource number is the number for one resource in a pre-configured resource period.

It should be noted that the new pre-configured resources determined according to the RRC signaling for re-configuring pre-configured resources may be the same as or different from the previous pre-configured resources.

IV. Release enabled resources of the pre-configured resource type 2.

In a first release way: release pre-configured resources through a timer or counter.

Figure 14:
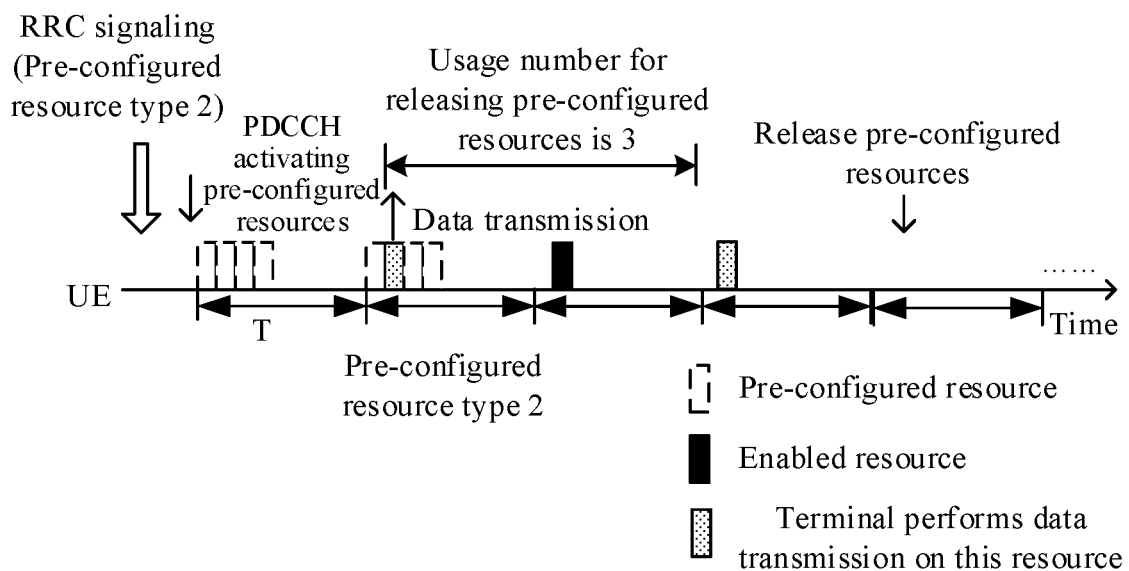
FIG. 14 is a schematic diagram of a scenario where pre-configured resources are released according to a counter provided by an embodiment of the present application.

Taking the counter as an example, the network-side device sets the usage number for releasing pre-configured resources through the counter. The counter is incremented by 1 each time the terminal sends data through the pre-configured resources. If the terminal does not send data on the enabled pre-configured resources in subsequent N pre-configured resource periods after the usage number for releasing pre-configured resources is reached, the terminal considers that the pre-configured resources have been released. Assuming that N is 1, FIG. 14 is a schematic diagram of a scenario where the network-side device releases the pre-configured resource type 2 through a counter.

Here, the usage duration or usage number for releasing the pre-configured resources may be specified by the protocol, or configured by the network-side device for the terminal through RRC signaling, or indicated by the PDCCH command for activating the pre-configured resources. For example, the network-side device indicates the usage time for disabling by the RRC signaling for configuring pre-configured resources.

It should be noted that, if the terminal still has service transmission requirements after the duration of the timer reaches the usage duration for releasing pre-configured resources or the amount of data sent using the pre-configured resources reaches the usage number for releasing pre-configured resources, the terminal may further continue to send data on subsequent pre-configured resources, until the terminal no longer sends data through the pre-configured resources, and then it is considered that the pre-configured resources are released.

In a second release way: release pre-configured resources through a resource release command carried by the MAC layer.

The network-side device releases the pre-configured resources according to the indication information for releasing pre-configured resources sent by the terminal, where the indication information is carried in the MAC layer. The network-side device can carry a disabling command through a separate MAC CE, and the network-side device depends on the MAC header that carries the LCID indicating the release of pre-configured resources contained in the MAC CE; or the network-side device releases the pre-configured resources corresponding to the pre-configured resource numbers through the pre-configured resource numbers of released pre-configured resources carried in the MAC CE.

In a third release way: release pre-configured resources through RRC signaling.

The network-side device reconfigures the pre-configured resources with the same pre-configured resource number through RRC signaling, and the currently enabled pre-configured resources with the same pre-configured resource number are released.

In a fourth release way: release pre-configured resources through a new PDCCH command to activate pre-configured resources.

The network side activates the new resource configuration through the new PDCCH command to activate pre-configured resources with the same pre-configured resource number. It can be understood that the pre-configured resources that have been activated and enabled previously in the pre-configured resource number are released when the new pre-configured resources are activated.

Figure 15:
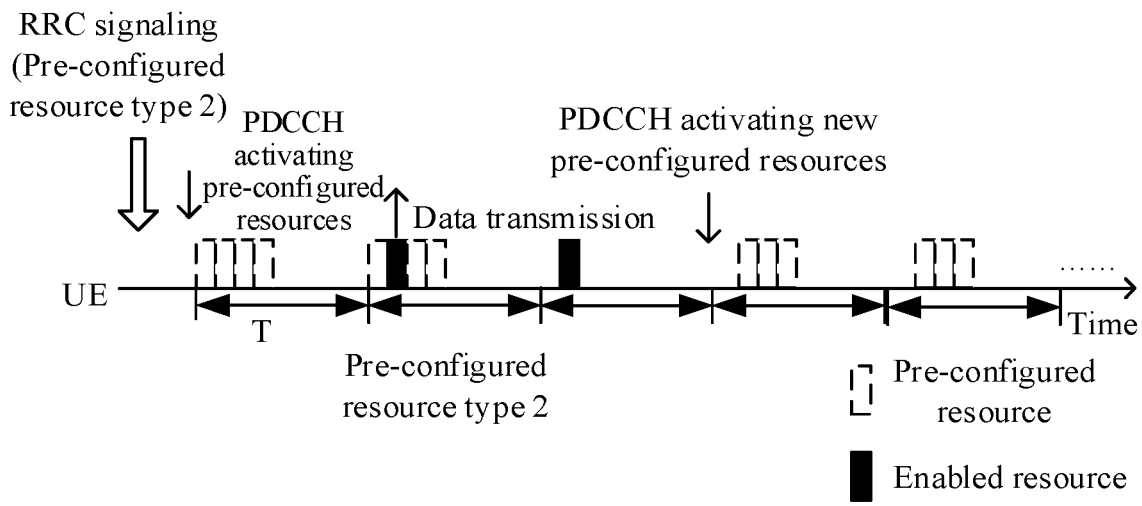

For example, as shown in FIG. 15, the network-side device configures the resource of pre-configured resource type 2 with the pre-configured resource number of 2 for the terminal and activates the resource through a PDCCH command, and the terminal sends data on the pre-configured resource. When the network-side device configures a new set of pre-configured resources for the terminal and the pre-configured resource number of the pre-configured resources is also 2, the network-side device sends a PDCCH command to activate the newly configured pre-configured resources to the terminal, releases the currently activated and enabled resources with the pre-configured resource number of 2, and determines the new pre-configured resources according to the new PDCCH command to activate pre-configured resources.

It should be noted that the "new" in the new PDCCH command to activate pre-configured resources can be understood as a PDCCH command sent by the network-side device after the PDCCH command to activate the existing pre-configured resources, and the new pre-configured resources determined according to the new PDCCH command to activate pre-configured resources may be the same as or different from the previous configuration of pre-configured resources.

In a fifth release way: release pre-configured resources through a PDCCH command to release pre-configured resources.

The network-side device releases the resources of the pre-configured resource type 2 configured for the terminal by carrying the PDCCH command to release pre-configured resources.

Those will be illustrated below by way of embodiments.

Embodiment 1: configuration and enabling of the pre-configured resource type 1 based on the Uu port;
Network side:
Step 1: a network-side device sends the RRC signaling to a terminal, where the RRC signaling includes some or all: the time start point of the first pre-configured resource, the position of the time-frequency resource, the transmission format, the number of continuous resources pre-configured in a pre-configured resource period, and other configuration information of pre-configured resources; and the number of continuous resources in a pre-configured resource period can be specified by the protocol if the RRC signaling does not include the indication of the number of continuous resources.
Step 2: the network-side device receives the uplink data sent by the terminal on the pre-configured resources, and determines the pre-configured resource used by the terminal to send a first data packet in the following way.

In a first determining way: determine the pre-configured resource to be used according to the maximum transmit power of the terminal.

The network-side device determines the transmit powers of the terminal on the pre-configured resources according to the power detection, and determines the maximum transmit power, that is, the transmit power of the terminal at the resource is higher than that at other pre-configured resources, and then the network-side device determines that the resource is the resource used by the terminal to send the first data packet. Further, the network-side device can also determine the pre-configured resources used by the terminal according to whether the received uplink data can be decoded into a data packet.

In a second determining way: according to the indication information in the data packet.

The terminal carries the indication information in a data packet, and the network-side device receives the data packet reported by the terminal and determines the pre-configured resource used by the terminal to send the first data packet according to the indication information carried in the data packet, and the indication information is carried on the MAC layer, and may be a single MAC CE or an MAC subheader.

Step 3: the network-side device enables the resource at the same position as the resource used by the terminal to send the first data packet in the pre-configured resource period.

The network-side device determines the position of the resource used by the terminal to send the first data packet in the above way, and enables the resource at the same position in each pre-configured resource period starting from the resource receiving the data packet. Other resources in the same pre-configured resource period become invalid for the terminal, that is, there is only one enabled resource in a pre-configured resource period, and the invalid resources may be configured for other terminals to use or dynamically scheduled for the terminal to use.

Step 4: the network-side device receives the uplink data of the terminal on the resources enabled in each pre-configured resource period.

Terminal side:
Step 1: a terminal receives the RRC signaling sent by a network-side device, and determines the configuration of pre-configured resources, including the number of continuous resources in a pre-configured resource period;
Step 2: when the data arrives, the terminal selects the closest resource from multiple continuous resources among the pre-configured resources to send a first data packet. Further, the terminal may also carry the indication information for enabling pre-configured resources in the first data packet, where the indication information is the MAC layer, or may be a separate MAC CE, or may be an MAC subheader containing the LCID instructing to disable pre-configured resources;
Step 3: the terminal uses the resource for sending the first data packet as the starting point of the enabled pre-configured resources, where the resource at the same position as the first data packet in each pre-configured resource period is used as the enabled resource, and other pre-configured resources in the same pre-configured resource period are invalid;
Step 4: the terminal performs data transmission on the resources that have been enabled among the pre-configured resources.

Embodiment 2: configuration and enabling of the pre-configured resource type 2 based on the Uu port;
Network side:
Step 1: a network-side device sends the RRC signaling to a terminal, where the RRC signaling includes some or all: the time start point of the first pre-configured resource, the position of the time-frequency resource, the transmission format, the number of continuous resources pre-configured in a pre-configured resource period, and other configuration information of pre-configured resources; sends a PDCCH command to activate the pre-configured resources, and indicates the number of continuous resources in a pre-configured resource period in the following way.

In a first indication way: indicate through the RRC signaling that configures pre-configured resources.

In a second indication way: indicate through a PDCCH command for activating pre-configured resources.

In a third indication way: stipulate through protocol.

Step 2: the network-side device receives the uplink data sent by the terminal on the pre-configured resources, and determines the pre-configured resource used by the terminal to send a first data packet through the specific step in step 2 of the network side in the first embodiment, which will not be repeated here.

Step 3: the network-side device enables the resource at the same position as the resource used by the terminal to send the first data packet in the pre-configured resource period.

The network-side device determines the position of the resource used by the terminal to send the first data packet in the above way, and enables the resource at the same position in each pre-configured resource period starting from the resource receiving the data packet. Other resources in the same pre-configured resource period become invalid for the terminal, that is, there is only one enabled resource in a pre-configured resource period, and the invalid resources may be configured for other terminals to use or dynamically scheduled for the terminal to use.

Step 4: the network-side device receives the uplink data of the terminal on the resources enabled in each pre-configured resource period.

Terminal side:
Step 1: a terminal receives the RRC signaling and a PDCCH command to activate pre-configured resources sent by a network-side device, determines the configuration of the pre-configured resources, including the number of continuous resources in a pre-configured resource period, and activates the pre-configured resources;

Step 2: when the data arrives, the terminal selects the closest resource from multiple continuous resources among the pre-configured resources to send a first data packet. Further, the terminal may also carry the indication information for enabling pre-configured resources in the first data packet, where the indication information is carried on the MAC layer, and may be a single MAC CE or an MAC subheader;

Step 3: the terminal uses the resource for sending the first data packet as the starting point of the enabled pre-configured resources, where the resource at the same position as the first data packet in each pre-configured resource period is used as the enabled resource, and other pre-configured resources in the same pre-configured resource period are invalid;

Step 4: the terminal performs data transmission on the resources that have been enabled among the pre-configured resources.

Embodiment 3: configuration and enabling of the pre-configured resource type 1 based on the sidelink interface;

Network side:
Step 1: a network-side device sends the RRC signaling to terminals and configures pre-configured resources on the sidelink interface for the sending terminal, and the RRC signaling includes some or all: the time start point of the first pre-configured resource, the position of the time-frequency resource, the transmission format, the number of continuous resources pre-configured in a pre-configured resource period, and other configuration information of pre-configured resources; and the number of continuous resources in a pre-configured resource period can be specified by the protocol if the RRC signaling does not include the indication of the number of continuous resources;

In one embodiment, Step 2: the network-side device receives the indication information about enabling pre-configured resources sent by the sending terminal, and determines the enabled resource in the pre-configured resources, where there is only one active resource in each pre-configured resource period, other pre-configured resources are invalid, and the invalid resources can be configured for other terminals to use or dynamically scheduled for the terminal to use.

Sending terminal:
Step 1: a sending terminal receives the RRC signaling sent by a network-side device, and determines the configuration of pre-configured resources on the sidelink interface, including the number of continuous resources in a pre-configured resource period;

Step 2: when the data arrives, the sending terminal selects the closest resource from multiple continuous resources among the pre-configured resources to send the transmission on the sidelink. In a possible embodiment, the sending terminal may send the indication information for enabling pre-configured resources to the network-side device through the Uu interface, where the indication information may be a separate MAC CE based on the Uu interface, and the MAC CE carries the resource number indicating the enabled resource in a pre-configured resource period among the pre-configured resources. For example, if the enabled resource is the first resource in the pre-configured resource period, the MAC CE carries the indication information that the resource number is 0; if the enabled resource is the second resource in the pre-configured resource period, the MAC CE carries the indication information that the resource number is 1, and so on. It should be noted that the number is only an example, and the present application is not limited to this number;

Step 3: the terminal uses the resource for sending the first sidelink transmission as the starting point of the enabled pre-configured resources, where the resource at the same position as the resource for sending the first sidelink transmission in each pre-configured resource period is used as the enabled resource, and other pre-configured resources in the same pre-configured resource period are invalid; and the terminal performs the sidelink transmission on the resources that have been enabled in the pre-configured resources.

Receiving terminal:
The receiving terminal has two possible transmission modes. One mode is: the sending terminal sends the SCI indication information to the receiving terminal during each data transmission, and the receiving terminal determines the resource location that needs to receive the sidelink transmission and/or the resource location that receives the sidelink transmission next time according to the received SCI indication information. In this mode, the receiving terminal cannot see the pre-configured resources.

Another mode is: the receiving terminal receives the configuration information of the pre-configured resources of the sidelink interface sent by the network-side device or the sending terminal, determines multiple continuous resources in a pre-configured resource period, and receives the data based on the pre-configured resources.

Embodiment 4: configuration and enabling of the pre-configured resource type 2 based on the sidelink interface;

Network side:

Step 1: a network-side device sends the RRC signaling to terminals and configures pre-configured resources on the sidelink interface for the sending terminal, where the RRC signaling includes some or all: the time start point of the first pre-configured resource, the position of the time-frequency resource, the transmission format, the number of continuous resources pre-configured in a pre-configured resource period, and other configuration information of pre-configured resources; sends a PDCCH command to activate the pre-configured resources, and indicates the number of continuous resources in a pre-configured resource period in the following way.

In a first indication way: indicate through the RRC signaling that configures pre-configured resources.

In a second indication way: indicate through a PDCCH command for activating pre-configured resources.

In a third indication way: stipulate through protocol.

In one embodiment, Step 2: the network-side device receives the indication information about enabling pre-configured resources sent by the sending terminal, and determines the enabled resource in the pre-configured resources, where there is only one active resource in each pre-configured resource period, other pre-configured resources are invalid, and the invalid resources can be configured for other terminals to use or dynamically scheduled for the terminal to use.

Sending terminal:

Step 1: a sending terminal receives the RRC signaling and a PDCCH command to activate pre-configured resources sent by a network-side device, determines the configuration of the pre-configured resources on the sidelink interface, including the number of continuous resources in a pre-configured resource period, and activates the pre-configured resources;

Step 2: when the data arrives, the sending terminal selects the closest resource from multiple continuous resources among the pre-configured resources to send the transmission on the sidelink. In a possible embodiment, the sending terminal may send the indication information for enabling pre-configured resources to the network-side device through the Uu interface, where the indication information may be a separate MAC CE based on the Uu interface, and the MAC CE carries the resource number indicating the enabled resource in a pre-configured resource period among the pre-configured resources. For example, if the enabled resource is the first resource in the pre-configured resource period, the MAC CE carries the indication information that the resource number is 0; if the enabled resource is the second resource in the pre-configured resource period, the MAC CE carries the indication information that the resource number is 1, and so on. It should be noted that the number is only an example, and the present application is not limited to this number;

Step 3: the terminal uses the resource for sending the first sidelink transmission as the starting point of the enabled pre-configured resources, where the resource at the same position as the resource for sending the first sidelink transmission in each pre-configured resource period is used as the enabled resource, and other pre-configured resources in the same pre-configured resource period are invalid; and the terminal performs the sidelink transmission on the resources that have been enabled in the pre-configured resources.

Receiving terminal.

The receiving terminal has two possible transmission modes. One mode is: the sending terminal sends the SCI indication information to the receiving terminal during each data transmission, and the receiving terminal determines the resource location that needs to receive the sidelink transmission and/or the resource location that receives the sidelink transmission next time according to the received SCI indication information. In this mode, the receiving terminal cannot see the pre-configured resources.

Another mode is: the receiving terminal receives the configuration information of the pre-configured resources of the sidelink interface sent by the network-side device or the sending terminal, determines multiple continuous resources in a pre-configured resource period, and receives the data based on the pre-configured resources.

Embodiment 5: implicit disabling of the pre-configured resource type 1 based on the Uu port;

Network side:

Step 1: when configuring pre-configured resources for a terminal, a network-side device can further configure the usage duration or usage number for disabling pre-configured resources for the terminal through a timer or counter; and the usage duration or usage number for disabling pre-configured resources may be configured by the RRC signaling configuring pre-configured resources or specified by a protocol.

Step 2: starting or restarting the timer when the terminal sends a first data packet through pre-configured resources, and determining that the pre-configured resources are disabled when the network-side device does not receive the data sent by the terminal at the enabled resource location in the pre-configured resources after the time of the timer exceeds the usage duration for disabling pre-configured resources; or starting or restarting the counter when the terminal sends a first data packet through pre-configured resources, and determining that the pre-configured resources are disabled when the network-side device does not receive the data sent by the terminal at the enabled resource location in the pre-configured resources after the count of the counter exceeds the usage number for disabling pre-configured resources.

Disabling the pre-configured resources can be understood as: the pre-configured resources roll back to the state where there are multiple continuous resources in a pre-configured resource period.

Terminal side:

Step 1: a terminal receives the RRC signaling for configuring pre-configured resources sent by a network-side device, and determines the usage duration or usage number for disabling pre-configured resources according to the RRC signaling;

Step 2: when the terminal sends a first data packet on the pre-configured resource, enabling the resource and the resource at the same position in each pre-configured resource period, and starting or restarting a timer at the same time; and determining that the pre-configured resource is disabled when the terminal does not send data at the enabled resource location in the pre-configured resources after the time of the timer exceeds the usage duration for disabling pre-configured resources; or starting or restarting a counter when the terminal sends a first data packet on the pre-configured resource, and determining that the pre-configured resource is disabled when the terminal does not send data at the enabled resource location in the pre-configured resources after the count of the counter exceeds the usage number for disabling pre-configured resources; where disabling the pre-configured resources can be understood as: the pre-configured resources roll back to the state where there are multiple continuous resources in a pre-configured resource period.

Embodiment 6: disabling of the pre-configured resource type 1 based on the Uu port—a terminal sends a disabling instruction;

Network side:
Step 1: refer to the processing mode of step 1 on the network side in the Embodiment 1, which will not be repeated here;
Step 2: the network-side device determines the position of the enabled resource in the pre-configured resources, and receives the data sent by the terminal according to the determined position of the pre-configured resource; if the received data packet sent from the terminal contains the indication information for disabling pre-configured resources, the network-side device disables the pre-configured resources according to the indication information, where disabling the pre-configured resources can be understood as: the pre-configured resources roll back to the state where there are multiple continuous resources in a pre-configured resource period.

Here, the indication information for disabling pre-configured resources may be a single MAC CE, and the MAC CE carries a resource number indicating the enabled resource in a pre-configured resource period among the pre-configured resources; or the indication information may be an MAC subheader that contains an LCID indicating the disabling of pre-configured resources. In one embodiment, the terminal may send a data packet carrying the indication information through the pre-configured resources, or may send the indication information through the dynamically scheduled uplink resources.

Terminal side:
Step 1: refer to the processing mode of step 1 on the terminal side in the Embodiment 1, which will not be repeated here;
Step 2: the terminal performs data transmission on the enabled resources in the pre-configured resources, and sends the indication information for disabling pre-configured resources to the network-side device after determining that the pre-configured resources need to be disabled, where disabling the pre-configured resources can be understood as: the pre-configured resources roll back to the state where there are multiple continuous resources in a pre-configured resource period.

Embodiment 7: disabling of the pre-configured resource type 1 based on the Uu port—reconfiguration of network-side device;

Network side:
Step 1: refer to the processing mode of step 1 on the network side in the Embodiment 1, which will not be repeated here;
Step 2: the network-side device receives the uplink transmission sent by the terminal according to the determined pre-configured resource position and resource period;
Step 3: the network-side device sends the RRC signaling to reconfigure the pre-configured resources with the same pre-configured resource number, disables the pre-configured resources with the same pre-configured resource number before the sent reconfiguration of pre-configured resources takes effect, and performs the new pre-configured resource configuration.

Terminal side:
Step 1: refer to the processing mode of step 1 on the terminal side in the Embodiment 1, which will not be repeated here;
Step 2: the terminal sends the uplink transmission on the enabled resource in the pre-configured resource period among the pre-configured resources;
Step 3: the terminal receives the RRC signaling for reconfiguring the pre-configured resources sent by the network-side device, determines the reconfiguration information of the pre-configured resources with the same pre-configured resource number, disables the pre-configured resources with the same pre-configured resource number before the reconfiguration of pre-configured resources takes effect, and performs the new pre-configured resource configuration.

Embodiment 8: implicit disabling or release indication of the pre-configured resource type 2 based on the Uu port;

Network side:
Step 1: a network-side device sends the RRC signaling for configuring pre-configured resources and a PDCCH command for activating pre-configured resources to the terminal. In one embodiment, when configuring pre-configured resources for the terminal, the usage duration or usage number for disabling or releasing pre-configured resources may also be configured for the terminal through a timer or counter; and the usage duration or usage number for disabling or releasing pre-configured resources may be configured by the RRC signaling for configuring pre-configured resources, or configured by the PDCCH command for activating pre-configured resources, or specified by a protocol;
Step 2: if the command is a command to disable pre-configured resources, starting or restarting the timer when the terminal sends a first data packet through pre-configured resources, and determining that the pre-configured resources are disabled when the network-side device does not receive the data sent by the terminal at the enabled resource location in the pre-configured resources after the time of the timer exceeds the usage duration for disabling pre-configured resources; or starting or restarting the counter when the terminal sends a first data packet through pre-configured resources, and determining that the pre-configured resources are disabled when the network-side device does not receive the data sent by the terminal at the enabled resource location in the pre-configured resources after the count of the counter exceeds the usage number for disabling pre-configured resources; where disabling the pre-configured resources can be understood as: the pre-configured resources roll back to the state where there are multiple continuous resources in a pre-configured resource period;
if the command is a command to release pre-configured resources, starting or restarting the timer when the terminal sends a first data packet through pre-configured resources, and determining that the pre-configured resources are released when the network-side device does not receive the data sent by the terminal at the enabled resource location in the pre-configured resources after the time of the timer exceeds the usage duration for releasing pre-configured resources; or starting or restarting the counter when the terminal sends a first data packet through pre-configured resources, and determining that the pre-configured resources are released when the network-side device does not receive the data sent by the terminal at the enabled resource location in the pre-configured resources after the count of the counter exceeds the usage number for releasing pre-configured resources. Releasing pre-configured resources can be understood as: the pre-configured resources roll back to the state when the network-side device has configured pre-configured resources for the terminal through RRC signaling but has not yet activated the pre-configured resources through the PDCCH, and subsequently the reconfigured pre-configured resources may be activated through a new PDCCH command.

Terminal side:

Step 1: receiving a command to disable or release pre-configured resources configured by a network-side device, and determining the usage duration or usage number for disabling or releasing pre-configured resources;

Step 2: if the terminal receives a command to disable pre-configured resources: after the pre-configured resources are activated and when the terminal sends a first data packet on the pre-configured resource, enabling the resource and the resource at the same position in each pre-configured resource period, and starting or restarting a timer at the same time; and determining that the pre-configured resource is disabled when the terminal does not send data at the enabled resource location in the pre-configured resources after the time of the timer exceeds the usage duration for disabling pre-configured resources; or starting or restarting a counter when the terminal sends a first data packet on the pre-configured resource, and determining that the pre-configured resource is disabled when the terminal does not send data at the enabled resource location in the next N pre-configured resource period after the count of the counter exceeds the usage number for disabling pre-configured resources; where disabling the pre-configured resources can be understood as: the pre-configured resources roll back to the state where there are multiple continuous resources in a pre-configured resource period;

if the terminal receives a command to release pre-configured resources: after the pre-configured resources are activated and when the terminal sends a first data packet on the pre-configured resource, enabling the resource and the resource at the same position in each pre-configured resource period, and starting or restarting a timer at the same time; and determining that the pre-configured resource is released when the terminal does not send data at the enabled resource location in the pre-configured resources after the time of the timer exceeds the usage duration for releasing pre-configured resources; or starting or restarting a counter when the terminal sends a first data packet on the pre-configured resource, and determining that the pre-configured resource is released when the terminal does not send data at the enabled resource location in the pre-configured resources after the count of the counter exceeds the usage number for releasing pre-configured resources; where releasing pre-configured resources can be understood as: the pre-configured resources roll back to the state when the network-side device has configured pre-configured resources for the terminal through RRC signaling but has not yet activated the pre-configured resources through the PDCCH, and subsequently the reconfigured pre-configured resources may be activated through a new PDCCH command.

Embodiment 9: disabling or release of the pre-configured resource type 2 based on the Uu port—a terminal sends a disabling or release instruction.

Network side:

Step 1: a terminal receives the RRC signaling and a PDCCH command to activate pre-configured resources sent by a network-side device, determines the configuration of the pre-configured resources, including the number of continuous resources in a pre-configured resource period, and activates the pre-configured resources;

Step 2: receiving the uplink transmission sent by the terminal according to the determined pre-configured resource location and pre-configured resource period after the pre-configured resources are activated, and the network-side device disables or releases the pre-configured resources according to the indication information if the received data packet sent by the terminal contains indication information for disabling or releasing pre-configured resources, and the indication information for disabling or releasing pre-configured resources may be a single MAC CE, and the MAC CE carries the resource number indicating the enabled resource in a pre-configured resource period among the pre-configured resources. Or, the indication information is an MAC subheader containing the LCID indicating the disabling of pre-configured resources. In one embodiment, the terminal may send a data packet carrying the indication information through the pre-configured resources, or may send the indication information through the dynamically scheduled uplink resources.

Disabling the pre-configured resources can be understood as: the pre-configured resources roll back to the state where there are multiple continuous resources in a pre-configured resource period.

Releasing pre-configured resources can be understood as: the pre-configured resources roll back to the state when the network-side device has configured pre-configured resources for the terminal through RRC signaling but has not yet activated the pre-configured resources through the PDCCH, and subsequently the reconfigured pre-configured resources may be activated through a new PDCCH command.

Terminal side:

Step 1: a terminal receives the RRC signaling and a PDCCH command for activating pre-configured resources sent by a network-side device;

Step 2: sending the uplink transmission according to the determined pre-configured resource location and resource period after the pre-configured resources are activated. After determining that the pre-configured resources need to be disabled, the indication information for disabling or releasing pre-configured resources is sent to the network-side device, and the indication information for disabling or releasing pre-configured resources may be a single MAC CE, and the MAC CE carries the resource number indicating the enabled resource in a pre-configured resource period among the pre-configured resources. Or, the indication information is an MAC subheader containing the LCID indicating the disabling of pre-configured resources.

The understanding of disabling pre-configured resources and releasing pre-configured resources can refer to the description on the network side described above, which will not be repeated here.

Embodiment 10: release of the pre-configured resource type 2 based on Uu interface—reconfiguration of network-side device;

Network side:
Step 1: refer to the processing mode of step 1 on the network side in the Embodiment 8, which will not be repeated here;
Step 2: receiving the uplink transmission sent by the terminal according to the determined pre-configured resource location and resource period after the pre-configured resources are activated;
Step 3: the network-side device sends the RRC signaling to reconfigure the pre-configured resources with the same pre-configured resource number, disables and releases the pre-configured resources with the same pre-configured resource number before the sent reconfiguration of pre-configured resources takes effect, and performs the new pre-configured resource configuration.

It can be understood that the released resource is in the disabled state, so the release of the resource can be understood as being disabled if the released pre-configured resource is in the enabled state.

Terminal side:
Step 1: refer to the processing mode of step 1 on the terminal side in the Embodiment 8, which will not be repeated here;
Step 2: the terminal sends the uplink transmission according to the determined pre-configured resource location and resource period after the pre-configured resources are activated;
Step 3: the terminal receives the RRC signaling for reconfiguring the pre-configured resources sent by the network-side device, determines the reconfiguration information of the pre-configured resources with the same pre-configured resource number, disables and releases the pre-configured resources with the same pre-configured resource number before the reconfiguration of pre-configured resources takes effect, and performs the new pre-configured resource configuration.

Embodiment 11: Release of the pre-configured resource type 2 based on Uu interface—the base station uses a PDCCH command to carry the release command;

Network side:
Step 1: refer to the processing mode of step 1 on the network side in the Embodiment 8, which will not be repeated here;
Step 2: receiving the uplink transmission sent by the terminal according to the determined pre-configured resource location and resource period after the pre-configured resources are activated;
Step 3: the network-side device sends a PDCCH command to release pre-configured resources, or the network-side device sends another PDCCH command to activate pre-configured resources with the same pre-configured resource number, disables and releases the pre-configured resources with the same pre-configured resource number before the sent reconfiguration of pre-configured resources takes effect, and performs the new pre-configured resource configuration.

Terminal side:
Step 1: a terminal receives a command to disable or release pre-configured resources configured by a network-side device;
Step 2: the terminal sends the uplink transmission according to the determined pre-configured resource location and resource period after the pre-configured resources are activated;
Step 3: the terminal receives a PDCCH command to release pre-configured resources, or receives a new PDCCH command to activate pre-configured resources with the same pre-configured resource number. If the terminal receives the PDCCH command to release pre-configured resources, it releases the pre-configured resources, and subsequently can activate the re-configured pre-configured resources through a new PDCCH command;

If the terminal receives a new PDCCH command to activate the pre-configured resources with the same pre-configured resource number, the terminal determines the reconfiguration information of the pre-configured resources with the same pre-configured resource number, disables and releases the pre-configured resources with the same pre-configured resource number before the reconfiguration of pre-configured resources takes effect, and performs the new pre-configured resource configuration.

Embodiment 12: enabling of the pre-configured resource type 1 based on the sidelink interface;

Network side:
Step 1: a network-side device configures the pre-configured resources of the sidelink interface for a terminal through RRC signaling; and at the same time, the network-side device determines to disable the pre-configured resources in the following way.

In a first disabling way: implicit disabling.
In a second disabling way: the terminal sends a disabling command.
In a third disabling way: reconfiguration of the network-side device.

The above-mentioned disabling ways 1 to 3 can refer to the specific related processing modes in the Embodiments 8-10. It should be noted that this embodiment is based on the sidelink interface, and the Embodiments 8-10 are based on the Uu port.

Sending terminal:
Step 1: receiving a command to configure pre-allocated resources sent by the base station. The duration threshold of a timer or the number threshold of a counter for deactivating the pre-allocated resources is determined according to the RRC configuration or PDCCH command instruction or protocol provision;
Step 2: sending the data transmission on the sidelink interface according to the determined pre-allocated resource location and resource period after the pre-allocated resources are activated, and starting or restarting the timer or counter for deactivating the pre-allocated resources at the same time. It is considered that the pre-allocated resources are deactivated if the timer or counter reaches or exceeds the preset threshold and the sending terminal does not send the data transmission on the sidelink interface on the pre-allocated resources. It is possible to roll back to the state where there are multiple pre-allocated resources in one period; or release the pre-allocated resources and wait for a subsequent PDCCH activation command to reallocate the pre-allocated resources. In one embodiment, the sending terminal sends a pre-allocated resource deactivation indication to the base station.

Receiving terminal:

If the receiving terminal can determine the effective pre-allocated resource period and resource location and other information, it starts or restarts a timer or counter for deactivating the pre-allocated resources when receiving the data transmission sent by the sending terminal on the pre-configured resources on the sidelink interface. It is considered that the pre-allocated resources are deactivated if the timer or counter reaches or exceeds the preset threshold and the terminal does not receive the data transmission sent by the sending terminal on the sidelink interface on the pre-allocated resources.

Embodiment 13: enabling of the pre-configured resource type 2 based on the sidelink interface;

Network side:

Step 1: a network-side device configures the pre-configured resources of the sidelink interface for a terminal through the RRC signaling, and activates the pre-configured resources through a PDCCH command; and at the same time, the network-side device determines to disable the pre-configured resources in the following way.

In a first disabling way: implicit disabling or releasing.

In a second disabling way: the terminal sends a disabling or release command.

In a third disabling way: the network-side device reconfigures the pre-configured resources through RRC signaling.

In a fourth disabling way: through a new PDCCH command to activate the pre-configured resources.

In a fifth disabling way: through a PDCCH command to disable and release the pre-configured resources.

The above-mentioned disabling ways 1 to 5 can refer to the specific related processing modes in the Embodiments 8-11. It should be noted that this embodiment is based on the sidelink interface, and the Embodiments 8-11 are based on the Uu port.

Sending terminal:

Step 1: receiving the RRC signaling to configure pre-configured resources on the sidelink and a PDCCH command to activate pre-configured resources sent by a network-side device;

Step 2: the terminal disables the pre-configured resources or releases the pre-configured resources according to the received command to disable or release the pre-configured resources sent by the network-side device after the pre-configured resources are activated, and disables or releases the pre-configured resources with the same pre-configured resource number before the sent reconfiguration of pre-configured resources takes effect if the terminal receives the RRC signaling to reconfigure the same pre-configured resource number or the PDCCH signaling to activate the new reconfigured pre-configured resources; and the terminal performs the new pre-configured resource configuration.

Receiving terminal:

If the receiving terminal can determine the information such as enabled pre-configured resources and pre-configured resource period, it receives a command to disable or release pre-configured resources sent by the sending terminal, determines to disable the pre-configured resources, and does not receive the sidelink transmission on the pre-configured resources.

Embodiment 14: a terminal reports the auxiliary information used to assist the network-side device to configure multiple consecutive pre-configured resources (applicable to the pre-allocated resource configuration of the Uu port and the sidelink interface);

Terminal side: the terminal sends the auxiliary information to the network-side device, and the auxiliary information carries the service model, including the service arrival period, the expected arrival time of the service data, the expected data packet size, the deviation of the expected arrival time of the service data (which can be expressed as several positive or negative time units), and the offset value of the expected arrival time of the service data, and the time unit of the time offset may be symbol, slot, subframe or millisecond;

Network side: the network-side device receives the auxiliary information reported by the terminal, configures pre-configured resources accordingly, and allocates the number of continuous pre-allocated resources in a period according to the expected arrival time of the service data and the expected time offset value.

Based on the same inventive concept, an embodiment of the present application further provides a network-side device for resource configuration. Since this device is the network-side device in a system for resource configuration and data transmission of the embodiments of the present application and the principle solving the problem of this device is similar to that of the method, the implementations of this device can refer to the implementations of the method, and the repeated description thereof will be omitted here.

As shown in FIG. 16, a first network-side device for resource configuration in an embodiment of the present application includes a processor 1600, a memory 1601 and a transceiver 1602.

The processor 1600 is responsible for managing the bus architecture and general processing, and the memory 1601 may store the data used by the processor 1600 when performing the operations. The transceiver 1602 is configured to receive and send the data under the control of the processor 1600.

The bus architecture may include any numbers of interconnected buses and bridges, and specifically link various circuits of one or more processors represented by the processor 1600 and the memory represented by the memory 1601. The bus architecture may further link various other circuits such as peripheral device, voltage regulator and power management circuit, which are all well known in the art and thus will not be further described again herein. The bus interface provides an interface. The processor 1600 is responsible for managing the bus architecture and general processing, and the memory 1601 may store the data used by the processor 1600 when performing the operations.

The procedure disclosed by the embodiment of the present application may be applied in the processor 1600 or implemented by the processor 1600. In the implementation process, each step of the signal processing flow may be completed by the integrated logic circuit of hardware in the processor 1600 or the instruction in the form of software. The processor 1600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1601, and the processor 1600 reads the information in the memory 1601 and completes the steps of the signal processing flow in combination with its hardware.

In one embodiment, the processor 1600 is configured to read the program in the memory 1601 and perform followings:

determining multiple continuous resources in a set of pre-configured resources configured for a terminal, and the multiple continuous resources are within a pre-configured resource period; and pre-configuring the determined multiple continuous resources for the terminal.

In one embodiment, the multiple continuous resources include:

continuous resources on adjacent symbols; or continuous resources on adjacent slots; or continuous resources on adjacent subframes; or adjacent continuous transmission resources in a same direction; and the adjacent continuous transmission resources in the same direction refer to resources continuously sent or continuously received by a same terminal, including continuous uplink resources or continuous sidelink resources.

In one embodiment, the processor 1600 is further configured to:

configure the number of continuous resources in a resource period for the terminal through RRC signaling used to configure pre-configured resources.

In one embodiment, the processor 1600 is further configured to:

configure the number of continuous resources in a resource period for the terminal through a PDCCH command used to activate pre-configured resources if it is determined that resources that need to be configured for the terminal belong to the pre-configured resource type 2.

In one embodiment, the processor 1600 is further configured to:

determine resources used by a first data packet sent by the terminal on the pre-configured resources and enable resources at a same position in each pre-configured resource period after pre-configuring the determined multiple continuous resources for the terminal; and enabling pre-configured resources means that the terminal can only use the enabled resources for pre-configuration transmission in each pre-configured resource period, and other resources are invalid for the terminal except for the enabled resources in the multiple continuous resources within the pre-configured resource period.

In one embodiment, the processor 1600 is further configured to:

configure the usage duration or usage number for disabling pre-configured resources for the terminal through RRC signaling; or receive the indication information for disabling pre-configured resources sent by the terminal after the pre-configured resources are enabled, and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources of the terminal roll back to a state where there are multiple continuous resources in a pre-configured resource period and the resources are activated and disabled.

In one embodiment, the processor 1600 is further configured to:

if it is determined that resources that need to be configured for the terminal belong to the pre-configured resource type 1, send the reconfiguration information containing pre-configured resources with same numbers as current pre-configured resources to the terminal through RRC signaling; and disable pre-configured resources corresponding to the pre-configured resource numbers according to the reconfiguration information, and determine new pre-configured resources according to the reconfiguration information.

In one embodiment, the processor 1600 is further configured to:

if it is determined that resources that need to be configured for the terminal belong to the pre-configured resource type 2, configure the usage duration or usage number for releasing pre-configured resources for the terminal through RRC signaling after pre-configured multiple continuous resources for the terminal, so that the terminal releases resources according to the usage duration or usage number for releasing pre-configured resources; or receive the indication information for releasing pre-configured resources sent by the terminal after activating the pre-configured resources, and the indication information is an MAC subheader containing an LCID indicating the release of pre-configured resources, or the indication information is an MAC CE containing pre-configured resource numbers of released pre-configured resources, and the MAC CE is used to instruct to release pre-configured resources corresponding to the pre-configured resource numbers; or send the reconfiguration information containing pre-configured resources with same numbers as current pre-configured resources to the terminal through RRC signaling, so that the terminal releases pre-configured resources corresponding to the pre-configured resource numbers according to the reconfiguration information and determines new pre-configured resources according to the reconfiguration information; or release pre-configured resources corresponding to the current pre-configured resource numbers through a new PDCCH command for activating pre-configured resources with same numbers as the current pre-configured resources, and activate pre-configured resources according to the new PDCCH command for activating pre-configured resources; or send a PDCCH command for releasing pre-configured resources to the terminal after activating the pre-configured resources, so that the terminal releases resources according to the PDCCH command for releasing pre-configured resources.

In one embodiment, the processor 1600 is further configured to:

release resources that are not enabled in the pre-configured resource period to the terminal.

In one embodiment, the processor 1600 is further configured to determine the resources used by the first data packet sent by the terminal in a following way:
use resources corresponding to the maximum transmit power of the terminal on the multiple continuous resources in the pre-configured resource period as the resources used by the terminal to send the first data packet; or
use resources carrying a data packet containing the indication information sent by the terminal among the pre-configured multiple continuous resources as the resources used by the terminal to send the first data packet;
and the indication information is carried by an MAC layer, and the indication information is an MAC CE or carried by an MAC subheader carrying a dedicated indication LCID.

In one embodiment, the processor 1600 is specifically configured to:
determine multiple continuous resources that need to be configured for the terminal according to the auxiliary information reported by the terminal;
and the auxiliary information includes some or all of:
service arrival period, expected arrival time of service data, expected data packet size, deviation of expected arrival time of service data.

Based on the same idea, as shown in FIG. 17, an embodiment of the present application provides a structural schematic diagram of another network-side device for resource configuration, which includes:
a first determining device 1700 configured to determine multiple continuous resources in a set of pre-configured resources configured for a terminal, and the multiple continuous resources are within a pre-configured resource period;
a first processing device 1701 configured to pre-configure the determined multiple continuous resources for the terminal.

In one embodiment, the multiple continuous resources include:
continuous resources on adjacent symbols; or continuous resources on adjacent slots; or continuous resources on adjacent subframes; or adjacent continuous transmission resources in a same direction; and the adjacent continuous transmission resources in the same direction refer to resources continuously sent or continuously received by a same terminal, including continuous uplink resources or continuous sidelink resources.

In one embodiment, the first processing device 1701 is further configured to:
configure the number of continuous resources in a resource period for the terminal through RRC signaling used to configure pre-configured resources.

In one embodiment, the first processing device 1701 is further configured to:
configure the number of continuous resources in a resource period for the terminal through a PDCCH command used to activate pre-configured resources if it is determined that resources that need to be configured for the terminal belong to the pre-configured resource type 2.

In one embodiment, the first processing device 1701 is further configured to:
determine resources used by a first data packet sent by the terminal on the pre-configured resources and enable resources at a same position in each pre-configured resource period after pre-configuring the determined multiple continuous resources for the terminal; and
enabling pre-configured resources means that the terminal can only use the enabled resources for pre-configuration transmission in each pre-configured period, and other resources are invalid for the terminal except for the enabled resources in the multiple continuous resources within the pre-configured resource period.

In one embodiment, the first processing device 1701 is further configured to:
configure the usage duration or usage number for disabling pre-configured resources for the terminal through RRC signaling; or
receive the indication information for disabling pre-configured resources sent by the terminal after the pre-configured resources are enabled, and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources of the terminal roll back to a state where there are multiple continuous resources in a pre-configured resource period and the resources are activated and disabled.

In one embodiment, the first processing device 1701 is further configured to:
if it is determined that resources that need to be configured for the terminal belong to the pre-configured resource type 1, send the reconfiguration information containing pre-configured resources with same numbers as current pre-configured resources to the terminal through RRC signaling; and disable pre-configured resources corresponding to the pre-configured resource numbers according to the reconfiguration information, and determine new pre-configured resources according to the reconfiguration information.

In one embodiment, the first processing device 1701 is further configured to:
if it is determined that resources that need to be configured for the terminal belong to the pre-configured resource type 2, configure the usage duration or usage number for releasing pre-configured resources for the terminal through RRC signaling after pre-configured multiple continuous resources for the terminal, so that the terminal releases resources according to the usage duration or usage number for releasing pre-configured resources; or
receive the indication information for releasing pre-configured resources sent by the terminal after activating the pre-configured resources, and the indication information is an MAC subheader containing an LCID indicating the release of pre-configured resources, or the indication information is an MAC CE containing pre-configured resource numbers of released pre-configured resources, and the MAC CE is used to instruct to release pre-configured resources corresponding to the pre-configured resource numbers; or
send the reconfiguration information containing pre-configured resources with same numbers as current pre-configured resources to the terminal through RRC signaling, so that the terminal releases pre-configured resources corresponding to the pre-configured resource numbers according to the reconfiguration information and determines new pre-configured resources according to the reconfiguration information; or release pre-configured resources corresponding to the current pre-configured resource numbers through a new PDCCH command for activating pre-configured resources with same numbers as the current pre-configured resources, and activate pre-configured resources according to the new PDCCH command for activating pre-configured resources; or send a PDCCH command for releasing pre-configured resources to the terminal after activating the pre-configured resources, so that the terminal releases resources according to the PDCCH command for releasing pre-configured resources.

In one embodiment, the first processing device 1701 is further configured to:

release resources that are not enabled in the pre-configured resource period to the terminal.

In one embodiment, the first processing device 1701 is further configured to determine the resources used by the first data packet sent by the terminal in a following way:

use resources corresponding to the maximum transmit power of the terminal on the multiple continuous resources in the pre-configured resource period as the resources used by the terminal to send the first data packet; or use resources carrying a data packet containing the indication information sent by the terminal among the pre-configured multiple continuous resources as the resources used by the terminal to send the first data packet;

and the indication information is carried by an MAC layer, and the indication information is an MAC CE or carried by an MAC subheader carrying a dedicated indication LCID.

In one embodiment, the first processing device 1701 is further configured to:

determine multiple continuous resources that need to be configured for the terminal according to the auxiliary information reported by the terminal;

and the auxiliary information includes some or all of:

service arrival period, expected arrival time of service data, expected data packet size, deviation of expected arrival time of service data.

Based on the same inventive concept, an embodiment of the present application further provides a terminal for data transmission. Since this device is the terminal in a system for resource configuration and data transmission of the embodiments of the present application and the principle solving the problem of this device is similar to that of the method, the implementations of this device can refer to the implementations of the method, and the repeated description thereof will be omitted here.

As shown in FIG. 18, an embodiment of the present application provides a terminal for data transmission, which includes a processor 1800, a memory 1801 and a transceiver 1802.

The processor 1800 is responsible for managing the bus architecture and general processing, and the memory 1801 may store the data used by the processor 1800 when performing the operations. The transceiver 1802 is configured to receive and send the data under the control of the processor 1800.

The bus architecture may include any numbers of interconnected buses and bridges, and specifically link various circuits of one or more processors represented by the processor 1800 and the memory represented by the memory 1801. The bus architecture may further link various other circuits such as peripheral device, voltage regulator and power management circuit, which are all well known in the art and thus will not be further described again herein. The bus interface provides an interface. The processor 1800 is responsible for managing the bus architecture and general processing, and the memory 1801 may store the data used by the processor 1800 when performing the operations.

The procedure disclosed by the embodiment of the present application may be applied in the processor 1800 or implemented by the processor 1800. In the implementation process, each step of the signal processing flow may be completed by the integrated logic circuit of hardware in the processor 1800 or the instruction in the form of software. The processor 1800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 1801, and the processor 1800 reads the information in the memory 1801 and completes the steps of the signal processing flow in combination with its hardware.

In one embodiment, the processor 1800 is configured to read the program in the memory 1801 and perform:

determine multiple continuous resources pre-configured by a network-side device; and perform data transmission through the pre-configured multiple continuous resources.

In one embodiment, the multiple continuous resources include:

continuous resources on adjacent symbols; or continuous resources on adjacent slots; or continuous resources on adjacent subframes; or adjacent continuous transmission resources in a same direction, i.e., resources that can be continuously sent or continuously received by a same terminal, including continuous uplink resources or continuous sidelink resources.

In one embodiment, the processor 1800 is further configured to:

determine the number of multiple continuous resources in a pre-configured resource period among pre-configured resources according to a received RRC signaling used by the network-side device to configure the pre-configured resources, or determining the number of multiple continuous resources in the pre-configured resource period according to a protocol provision.

In one embodiment, the processor 1800 is further configured to:

when the pre-configured multiple continuous resources belong to the pre-configured resource type 2, determine the number of multiple continuous resources in a pre-configured resource period according to a received PDCCH command for activating pre-configured resources sent by the network-side device.

In one embodiment, the processor 1800 is further configured to:
enable resources at the same position as the resources used to send the first data packet in each pre-configured resource period after sending the first data packet through pre-configured resources; and enabling pre-configured resources means that the terminal can only use the enabled resources for pre-configuration transmission in each pre-configured resource period, and other resources are invalid for the terminal except for the enabled resources in the multiple continuous resources within the pre-configured resource period.

In one embodiment, the processor 1800 is further configured to:
disable activated resources in each resource period if no data is transmitted through pre-configured resources in next N resource periods after determining that the usage duration or usage number for disabling pre-configured resources configured by the network-side device through RRC signaling is reached or exceeded; or
send the indication information for disabling pre-configured resources to the network-side device after activating the pre-configured resources; and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources configured by the network-side device for the terminal roll back to a state where multiple continuous resources in the pre-configured resource period are restored to be activated and disabled.

In one embodiment, the processor 1800 is further configured to:
when the pre-configured multiple continuous resources belong to the pre-configured resource type 1, and after receiving the reconfiguration information containing pre-configured resources with same numbers as current pre-configured resources sent by the network-side device through RRC signaling, disable pre-configured resources corresponding to the pre-configured resource numbers according to the reconfiguration information, and determine new pre-configured resources according to the reconfiguration information.

In one embodiment, the processor 1800 is further configured to:
when the pre-configured multiple continuous resources belong to the pre-configured resource type 2, disable activated resources in each resource period and release the pre-configured multiple continuous resources if no data is transmitted through pre-configured resources in next N resource periods after determining that the usage duration or usage number for releasing resources configured by the network-side device through RRC signaling is reached or exceeded; or
release the pre-configured multiple continuous resources after receiving a release command sent by the network-side device through MAC CE or RRC signaling; or
deactivate activated resources in the current pre-configured resources after receiving a deactivation command sent by the network-side device through a new PDCCH command for activating other pre-configured resources, and activate pre-configured resources corresponding to the new PDCCH command for activating other pre-configured resources;
release the pre-configured multiple continuous resources after receiving a release command sent by the network-side device through a PDCCH command.

In one embodiment, the processor 1800 is further configured to:
put the indication information indicating resources used for sending the first data packet in the first data packet.

In one embodiment, the processor 1800 is further configured to:
send the auxiliary information for determining multiple continuous resources that need to be configured for the terminal to the network-side device;
and the auxiliary information includes some or all of:
service arrival period, expected arrival time of service data, expected data packet size, deviation of expected arrival time of service data.

Based on the same idea, as shown in FIG. 19, an embodiment of the present application provides a structural schematic diagram of another terminal for data transmission, which includes:
a second determining device 1900 configured to determine multiple continuous resources pre-configured by a network-side device;
a second processing device 1901 configured to perform data transmission through the pre-configured multiple continuous resources.

In one embodiment, the multiple continuous resources include:
continuous resources on adjacent symbols; or continuous resources on adjacent slots; or continuous resources on adjacent subframes; or adjacent continuous transmission resources in a same direction, i.e., resources that can be continuously sent or continuously received by a same terminal, including continuous uplink resources or continuous sidelink resources.

In one embodiment, the second processing device 1901 is further configured to:
determine the number of multiple continuous resources in a pre-configured resource period among pre-configured resources according to a received RRC signaling used by the network-side device to configure the pre-configured resources, or determining the number of multiple continuous resources in the pre-configured resource period according to a protocol provision.

In one embodiment, the second processing device 1901 is further configured to:
when the pre-configured multiple continuous resources belong to the pre-configured resource type 2, determine the number of multiple continuous resources in a pre-configured resource period according to a received PDCCH command for activating pre-configured resources sent by the network-side device.

In one embodiment, the second processing device 1901 is further configured to:
enable resources at the same position as the resources used to send the first data packet in each pre-configured resource period after sending the first data packet through pre-configured resources; and enabling pre-configured resources means that the terminal can only use the enabled resources for pre-configuration transmission in each pre-configured resource period, and other resources are invalid for the terminal except for the enabled resources in the multiple continuous resources within the pre-configured resource period.

In one embodiment, the second processing device 1901 is further configured to:
  disable activated resources in each resource period if no data is transmitted through pre-configured resources in next N resource periods after determining that the usage duration or usage number for disabling pre-configured resources configured by the network-side device through RRC signaling is reached or exceeded; or
  send the indication information for disabling pre-configured resources to the network-side device after activating the pre-configured resources; and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources configured by the network-side device for the terminal roll back to a state where multiple continuous resources in the pre-configured resource period are restored to be activated and disabled.

In one embodiment, the second processing device 1901 is further configured to:
  when the pre-configured multiple continuous resources belong to the pre-configured resource type 1, and after receiving the reconfiguration information containing pre-configured resources with same numbers as current pre-configured resources sent by the network-side device through RRC signaling, disable pre-configured resources corresponding to the pre-configured resource numbers according to the reconfiguration information, and determine new pre-configured resources according to the reconfiguration information.

In one embodiment, the second processing device 1901 is further configured to:
  when the pre-configured multiple continuous resources belong to the pre-configured resource type 2, disable activated resources in each resource period and release the pre-configured multiple continuous resources if no data is transmitted through pre-configured resources in next N resource periods after determining that the usage duration or usage number for releasing resources configured by the network-side device through RRC signaling is reached or exceeded; or
  release the pre-configured multiple continuous resources after receiving a release command sent by the network-side device through MAC CE or RRC signaling; or
  deactivate activated resources in the current pre-configured resources after receiving a deactivation command sent by the network-side device through a new PDCCH command for activating other pre-configured resources, and activate pre-configured resources corresponding to the new PDCCH command for activating other pre-configured resources;
  release the pre-configured multiple continuous resources after receiving a release command sent by the network-side device through a PDCCH command.

In one embodiment, the second processing device 1901 is further configured to:
  put the indication information indicating resources used for sending the first data packet in the first data packet.

In one embodiment, the second processing device 1901 is further configured to:
  send the auxiliary information for determining multiple continuous resources that need to be configured for the terminal to the network-side device;
  and the auxiliary information includes some or all of:
  service arrival period, expected arrival time of service data, expected data packet size, deviation of expected arrival time of service data.

Based on the same inventive concept, an embodiment of the present application further provides a method for resource configuration. Since this method corresponds to the method corresponding to the network-side device in a system for resource configuration and data transmission of the embodiments of the present application and the principle solving the problem of this method is similar to that of the device, the implementations of this method can refer to the implementations of the terminal, and the repeated description thereof will be omitted here.

As shown in FIG. 20, which is a flow chart of a method for resource configuration provided by an embodiment of the present application, the method specifically includes the following steps:
  Step 2000: a network-side device determines multiple continuous resources in a set of pre-configured resources configured for a terminal, and the multiple continuous resources are within a pre-configured resource period;
  Step 2001: the network-side device pre-configures the determined multiple continuous resources for the terminal.

In one embodiment, the multiple continuous resources include:
  continuous resources on adjacent symbols; or
  continuous resources on adjacent slots; or
  continuous resources on adjacent subframes; or
  adjacent continuous transmission resources in a same direction; and the adjacent continuous transmission resources in the same direction refer to resources continuously sent or continuously received by a same terminal, including continuous uplink resources or continuous sidelink resources.

In one embodiment, the step in which the network-side device pre-configures the determined multiple continuous resources for the terminal further includes:
  the network-side device configures the number of continuous resources in a resource period for the terminal through RRC signaling used to configure pre-configured resources.

In one embodiment, the network-side device determines that resources that need to be configured for the terminal belong to the pre-configured resource type 2;
  the step in which the network-side device pre-configures the determined multiple continuous resources for the terminal further includes:
  the network-side device configures the number of continuous resources in a resource period for the terminal through a PDCCH command used to activate pre-configured resources.

In one embodiment, after the network-side device pre-configures the determined multiple continuous resources for the terminal, the method further includes:
  the network-side device determines resources used by a first data packet sent by the terminal on the pre-configured resources and enables resources at the same position in each pre-configured resource period; and enabling pre-configured resources means that the terminal can only use the enabled resources for pre-configuration transmission in each pre-configured resource period, and other resources are invalid for the terminal except for the enabled resources in the multiple continuous resources within the pre-configured resource period.

In one embodiment, after the network-side device pre-configures the determined multiple continuous resources for the terminal, the method further includes:

the network-side device configures the usage duration or usage number for disabling pre-configured resources for the terminal through RRC signaling; or the network-side device receives the indication information for disabling pre-configured resources sent by the terminal after the pre-configured resources are enabled, and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources of the terminal roll back to a state where there are multiple continuous resources for allocation in a pre-configured resource period and the resources are activated and disabled.

In one embodiment, the network-side device determines that resources that need to be configured for the terminal belong to the pre-configured resource type 1;

after the network-side device activates the resources at the same position in each resource period, the method further includes:

the network-side device sends the reconfiguration information containing pre-configured resources with same numbers as current pre-configured resources to the terminal through RRC signaling; and the network-side device disables pre-configured resources corresponding to the pre-configured resource numbers according to the reconfiguration information, and determines new pre-configured resources according to the reconfiguration information.

In one embodiment, the network-side device determines that resources that need to be configured for the terminal belong to the pre-configured resource type 2;

after the network-side device pre-configures the determined multiple continuous resources for the terminal, the method further includes:

the network-side device configures the usage duration or usage number for releasing pre-configured resources for the terminal through RRC signaling, so that the terminal releases resources according to the usage duration or usage number for releasing pre-configured resources; or the network-side device receives the indication information for releasing pre-configured resources sent by the terminal after activating the pre-configured resources, and the indication information is an MAC subheader containing an LCID indicating the release of pre-configured resources, or the indication information is an MAC CE containing pre-configured resource numbers of released pre-configured resources, and the MAC CE is used to instruct to release pre-configured resources corresponding to the pre-configured resource numbers; or the network-side device sends the reconfiguration information containing pre-configured resources with same numbers as current pre-configured resources to the terminal through RRC signaling, so that the terminal releases pre-configured resources corresponding to the pre-configured resource numbers according to the reconfiguration information and determines new pre-configured resources according to the reconfiguration information; or the network-side device releases pre-configured resources corresponding to the current pre-configured resource numbers through a new PDCCH command for activating pre-configured resources with same numbers as the current pre-configured resources, and activating pre-configured resources according to the new PDCCH command for activating pre-configured resources; or the network-side device sends a PDCCH command for releasing pre-configured resources to the terminal after activating the pre-configured resources, so that the terminal releases resources according to the PDCCH command for releasing pre-configured resources.

In one embodiment, after the network-side device determines the resource used by the first data packet sent by the terminal, the method further includes:

the network-side device releases the resources that are not enabled in the pre-configured resource period to the terminal.

In one embodiment, the network-side device determines the resources used by the first data packet sent by the terminal in a following way:

the network-side device uses the resources corresponding to the maximum transmit power of the terminal on the multiple continuous resources in the pre-configured resource period as the resources used by the terminal to send the first data packet; or the network-side device uses the resources carrying a data packet containing the indication information sent by the terminal among the pre-configured multiple continuous resources as the resources used by the terminal to send the first data packet;

and the indication information is carried by an MAC layer, and the indication information is an MAC CE or carried by an MAC subheader carrying a dedicated indication LCID.

In one embodiment, the step in which the network-side device determines multiple continuous resources that need to be configured for the terminal in the pre-configured resource period among pre-configured resources of the terminal includes:

the network-side device determines multiple continuous resources that need to be configured for the terminal according to the auxiliary information reported by the terminal;

and the auxiliary information includes some or all of:

service arrival period, expected arrival time of service data, expected data packet size, deviation of expected arrival time of service data.

Based on the same inventive concept, an embodiment of the present application further provides a method for data transmission. Since this method corresponds to the method corresponding to the terminal in a system for resource configuration and data transmission of the embodiments of the present application and the principle solving the problem of this method is similar to that of the terminal, the implementations of this method can refer to the implementations of the terminal, and the repeated description thereof will be omitted here.

As shown in FIG. 21, which is a flow chart of a method for data transmission provided by an embodiment of the present application, the method specifically includes the following steps:

Step 2100: a terminal determines multiple continuous resources pre-configured by a network-side device;

Step 2101: the terminal performs data transmission through the pre-configured multiple continuous resources.

In one embodiment, the multiple continuous resources include:

continuous resources on adjacent symbols; or continuous resources on adjacent slots; or continuous resources on adjacent subframes; or adjacent continuous transmission resources in a same direction, i.e., resources that can be continuously sent or continuously received by a same terminal, including continuous uplink resources or continuous sidelink resources.

In one embodiment, the step in which the terminal determines multiple continuous resources pre-configured by the network-side device further includes:

the terminal determines the number of multiple continuous resources in a pre-configured resource period among pre-configured resources according to a received RRC signaling used by the network-side device to configure the pre-configured resources, or determines the number of multiple continuous resources in the pre-configured resource period according to a protocol provision.

In one embodiment, the pre-configured multiple continuous resources belong to the pre-configured resource type 2;

the step in which the terminal determines multiple continuous resources pre-configured by the network-side device further includes:

the terminal determines the number of multiple continuous resources in a pre-configured resource period according to a received PDCCH command for activating pre-configured resources sent by the network-side device.

In one embodiment, the step in which the terminal performs data transmission through the pre-configured multiple continuous resources further includes:

the terminal enables resources at the same position as the resources used to send the first data packet in each pre-configured resource period after sending the first data packet through pre-configured resources; and enabling pre-configured resources means that the terminal can only use the enabled resources for pre-configuration transmission in each pre-configured resource period, and other resources are invalid for the terminal except for the enabled resources in the multiple continuous resources within the pre-configured resource period.

In one embodiment, after the terminal performs data transmission through the pre-configured multiple continuous resources, the method further includes:

the terminal disables activated resources in each resource period if no data is transmitted through pre-configured resources in next N resource periods after determining that the usage duration or usage number for disabling pre-configured resources configured by the network-side device through RRC signaling is reached or exceeded; or the terminal sends the indication information for disabling pre-configured resources to the network-side device after activating the pre-configured resources; and the indication information is an MAC subheader containing an LCID indicating the disabling of pre-configured resources, or the indication information is an MAC CE containing pre-configured resource numbers of disabled pre-configured resources, and the MAC CE is used to instruct to disable pre-configured resources corresponding to the pre-configured resource numbers; and disabling pre-configured resources means that the pre-configured resources configured by the network-side device for the terminal roll back to the state where multiple continuous resources in the pre-configured resource period are restored to be activated and disabled.

In one embodiment, the pre-configured multiple continuous resources belong to the pre-configured resource type 1;

after the terminal performs data transmission through the pre-configured multiple continuous resources, the method further includes:

after receiving the reconfiguration information containing pre-configured resources with same numbers as current pre-configured resources sent by the network-side device through RRC signaling, the terminal disables pre-configured resources corresponding to the pre-configured resource numbers according to the reconfiguration information, and determines new pre-configured resources according to the reconfiguration information.

In one embodiment, the pre-configured multiple continuous resources belong to the pre-configured resource type 2;

the method further includes:

the terminal disables activated resources in each resource period and releases the pre-configured multiple continuous resources if no data is transmitted through pre-configured resources in next N resource periods after determining that the usage duration or usage number for releasing resources configured by the network-side device through RRC signaling is reached or exceeded; or the terminal releases the pre-configured multiple continuous resources after receiving a release command sent by the network-side device through MAC CE or RRC signaling; or the terminal deactivates activated resources in the current pre-configured resources after receiving a deactivation command sent by the network-side device through a new PDCCH command for activating other pre-configured resources, and activates pre-configured resources corresponding to the new PDCCH command for activating other pre-configured resources;

the terminal releases the pre-configured multiple continuous resources after receiving a release command sent by the network-side device through a PDCCH command.

In one embodiment, the step in which the terminal sends the first data packet through pre-configured resources further includes:

the terminal puts the indication information indicating resources used for sending the first data packet in the first data packet.

In one embodiment, before the terminal determines the multiple continuous resources pre-configured by the network-side device, the method further includes:

the terminal sends the auxiliary information for determining multiple continuous resources that need to be configured for the terminal to the network-side device;

and the auxiliary information includes some or all of:

service arrival period, expected arrival time of service data, expected data packet size, deviation of expected arrival time of service data.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for resource configuration, comprises:
    determining, by a network-side device, multiple continuous resources in a set of pre-configured resources configured for a terminal, wherein the multiple continuous resources are within a pre-configured resource period;
    pre-configuring, by the network-side device, determined multiple continuous resources for the terminal;
    wherein the pre-configuring, by the network-side device, the determined multiple continuous resources for the terminal, further comprises:
    configuring, by the network-side device, a quantity of continuous resources in a resource period for the terminal through Radio Resource Control, RRC, signaling used to configure pre-configured resources.

2. The method of claim 1, wherein the multiple continuous resources comprise:
    continuous resources on adjacent symbols; or
    continuous resources on adjacent slots; or
    continuous resources on adjacent subframes; or
    adjacent continuous transmission resources in a same direction; wherein the adjacent continuous transmission resources in the same direction refer to resources continuously sent or continuously received by a same terminal, and comprise continuous uplink resources or continuous sidelink resources.

3. The method of claim 1, wherein in response to that the network-side device determines that resources that need to be configured for the terminal belong to a pre-configured resource type 2;
    The pre-configuring, by the network-side device, the determined multiple continuous resources for the terminal, further comprises:
    configuring, by the network-side device, a quantity of continuous resources in a resource period for the terminal through a Physical Downlink Control Channel, PDCCH, command used to activate pre-configured resources.

4. The method of claim 1, wherein after the network-side device pre-configures the determined multiple continuous resources for the terminal, the method further comprises:
    determining, by the network-side device, resources used by a first data packet sent by the terminal on the pre-configured resources, and enabling resources at a same position in each pre-configured resource period; wherein other resources are invalid for the terminal except for the enabled resources in the multiple continuous resources within the pre-configured resource period.

5. The method of claim 4, wherein after the network-side device pre-configures the determined multiple continuous resources for the terminal, the method further comprises:
    configuring, by the network-side device, a usage duration or usage number for disabling pre-configured resources for the terminal through RRC signaling; or
    receiving, by the network-side device, indication information for disabling pre-configured resources sent by the terminal after the pre-configured resources are enabled, wherein the indication information is a Medium Access Control, MAC, subheader containing a Logical Channel Identity, LCID, indicating the disabling of pre-configured resources, or the indication information is a Medium Access Control Control Element, MAC CE, containing pre-configured resource numbers of disabled pre-configured resources, wherein the MAC CE is used to instruct to disable pre-configured resources corresponding to the pre-configured resource numbers; wherein disabling pre-configured resources means that the pre-configured resources of the terminal roll back to a state where there are multiple continuous resources for allocation in a pre-configured resource period and the resources are activated and disabled.

6. The method of claim 5, wherein, after the network-side device determines the resources used by the first data packet sent by the terminal, the method further comprises:
    releasing, by the network-side device, resources that are not enabled in the pre-configured resource period to the terminal.

7. The method of claim 5, wherein the network-side device determines the resources used by the first data packet sent by the terminal in a following way:
    using, by the network-side device, resources corresponding to a maximum transmit power of the terminal on the multiple continuous resources in the pre-configured resource period as the resources used by the terminal to send the first data packet; or
    using, by the network-side device, resources carrying a data packet containing indication information sent by the terminal among the pre-configured multiple continuous resources as the resources used by the terminal to send the first data packet;
    wherein the indication information is carried by an MAC layer, and the indication information is an MAC CE or the indication information is carried by an MAC subheader carrying a dedicated indication LCID.

8. The method of claim 5, wherein in response to that the network-side device determines that resources that need to be configured for the terminal belong to a pre-configured resource type 1;
    after the network-side device activates the resources at the same position in each resource period, the method further comprises:
    sending, by the network-side device, reconfiguration information containing pre-configured resources with pre-configured resource numbers being the same with pre-configured resource numbers of current pre-configured resources to the terminal through RRC signaling;

disabling, by the network-side device, pre-configured resources corresponding to the pre-configured resource numbers according to the reconfiguration information, and determining new pre-configured resources according to the reconfiguration information;

wherein in response to that the network-side device determines that resources that need to be configured for the terminal belong to a pre-configured resource type 2;

after the network-side device pre-configures the determined multiple continuous resources for the terminal, the method further comprises:

configuring, by the network-side device, a usage duration or usage number for releasing pre-configured resources for the terminal through RRC signaling, so that the terminal releases resources according to the usage duration or usage number for releasing pre-configured resources; or receiving, by the network-side device, indication information for releasing pre-configured resources sent by the terminal after activating the pre-configured resources, wherein the indication information is an MAC subheader containing an LCID indicating the release of pre-configured resources, or the indication information is an MAC CE containing pre-configured resource numbers of released pre-configured resources, wherein the MAC CE is used to instruct to release pre-configured resources corresponding to the pre-configured resource numbers; or sending, by the network-side device, reconfiguration information containing pre-configured resources with pre-configured resource numbers being the same as pre-configured resource numbers of current pre-configured resources to the terminal through RRC signaling, so that the terminal releases pre-configured resources corresponding to the pre-configured resource numbers according to the reconfiguration information and determines new pre-configured resources according to the reconfiguration information; or releasing, by the network-side device, pre-configured resources corresponding to the current pre-configured resource numbers through a new PDCCH command for activating pre-configured resources with pre-configured resource numbers being the same as pre-configured resource numbers of the current pre-configured resources, and activating pre-configured resources according to the new PDCCH command for activating pre-configured resources; or sending, by the network-side device, a PDCCH command for releasing pre-configured resources to the terminal after activating the pre-configured resources, so that the terminal releases resources according to the PDCCH command for releasing pre-configured resources.

9. The method of claim 1, wherein the determining, by the network-side device, multiple continuous resources that need to be configured for the terminal in the pre-configured resource period among pre-configured resources of the terminal, comprises:

determining, by the network-side device, multiple continuous resources that need to be configured for the terminal according to auxiliary information reported by the terminal;

wherein the auxiliary information comprises some or all of:

service arrival period, expected arrival time of service data, expected data packet size, deviation of expected arrival time of service data.

10. A data transmission method, comprises:

determining, by a terminal, multiple continuous resources pre-configured by a network-side device;

performing, by the terminal, data transmission through the pre-configured multiple continuous resources;

wherein the determining, by the terminal, multiple continuous resources pre-configured by the network-side device, further comprises:

determining, by the terminal, a quantity of multiple continuous resources in a pre-configured resource period among pre-configured resources according to a received RRC signaling, or determining a quantity of multiple continuous resources in the pre-configured resource period according to a protocol provision.

11. The method of claim 10, wherein the multiple continuous resources comprise:

continuous resources on adjacent symbols; or
continuous resources on adjacent slots; or
continuous resources on adjacent subframes; or
adjacent continuous transmission resources in a same direction refer to resources that are continuously sent or continuously received by a same terminal, and comprise continuous uplink resources or continuous sidelink resources.

12. The method of claim 10, wherein in response to that the pre-configured multiple continuous resources belong to a pre-configured resource type 2;

the determining, by the terminal, multiple continuous resources pre-configured by the network-side device, further comprises:

determining, by the terminal, a quantity of multiple continuous resources in a pre-configured resource period according to a received PDCCH command for activating pre-configured resources sent by the network-side device.

13. The method of claim 10, wherein the performing, by the terminal, data transmission through the pre-configured multiple continuous resources, further comprises:

enabling, by the terminal, resources at a same position as resources used to send a first data packet in each pre-configured resource period after sending the first data packet through pre-configured resources; wherein other resources are invalid for the terminal except for the enabled resources in the multiple continuous resources within the pre-configured resource period;

wherein after the terminal performs data transmission through the pre-configured multiple continuous resources, the method further comprises:

disabling, by the terminal, activated resources in each resource period in response to that no data is transmitted through pre-configured resources in next N resource periods after determining that the usage duration or usage number for disabling pre-configured resources configured by the network-side device through RRC signaling is reached or exceeded, wherein N is a positive integer; or sending, by the terminal, indication information for disabling pre-configured resources to the network-side device; wherein the indication information is an MAC subheader containing an LCID indicating the disabling of pre-configured resources, or the indication information is an MAC CE containing pre-configured resource numbers of disabled pre-configured resources, wherein the MAC CE is used to instruct to disable pre-configured resources corresponding to the pre-configured resource numbers; wherein disabling pre-configured resources means that the pre-configured resources configured by the network-side device for the terminal roll back to a state where multiple continuous resources in the pre-configured resource period are restored to be activated and disabled.

14. The method of claim 13, wherein in response to that the pre-configured multiple continuous resources belong to a pre-configured resource type 1;
after the terminal performs data transmission through the pre-configured multiple continuous resources, the method further comprises:
after receiving reconfiguration information containing pre-configured resources with pre-configured resource numbers being the same as pre-configured resource numbers of current pre-configured resources sent by the network-side device through RRC signaling, disabling, by the terminal, pre-configured resources corresponding to the pre-configured resource numbers according to the reconfiguration information, and determining new pre-configured resources according to the reconfiguration information;
wherein in response to that the pre-configured multiple continuous resources belong to a pre-configured resource type 2;
the method further comprises:
disabling, by the terminal, activated resources in each resource period and releasing the pre-configured multiple continuous resources in response to that no data is transmitted through pre-configured resources in next N resource periods after determining that the usage duration or usage number for releasing resources configured by the network-side device through RRC signaling is reached or exceeded, wherein N is a positive integer; or
releasing, by the terminal, the pre-configured multiple continuous resources after receiving a release command sent by the network-side device through MAC CE or RRC signaling; or
deactivating, by the terminal, activated resources in the current pre-configured resources after receiving a deactivation command sent by the network-side device through a new PDCCH command for activating other pre-configured resources, and activating pre-configured resources corresponding to the new PDCCH command for activating other pre-configured resources;
releasing, by the terminal, the pre-configured multiple continuous resources after receiving a release command sent by the network-side device through a PDCCH command.

15. The method of claim 13, wherein the sending, by the terminal, the first data packet through pre-configured resources, further comprises:
putting, by the terminal, indication information indicating resources in the first data packet, wherein the indication information is used for sending the first data packet.

16. The method of claim 10, wherein before the terminal determines the multiple continuous resources pre-configured by the network-side device, the method further comprises:
sending, by the terminal, auxiliary information for determining multiple continuous resources that need to be configured for the terminal to the network-side device;
wherein the auxiliary information comprises some or all of:
service arrival period, expected arrival time of service data, expected data packet size, deviation of expected arrival time of service data.

17. A network-side device for resource configuration, comprises: a processor, a memory and a transceiver;
wherein the processor is configured to read a program in the memory and perform followings:
determining multiple continuous resources in a set of pre-configured resources configured for a terminal, wherein the multiple continuous resources are within a pre-configured resource period; and pre-configuring the determined multiple continuous resources for the terminal;
wherein the pre-configuring the determined multiple continuous resources for the terminal, further comprises:
configuring a quantity of continuous resources in a resource period for the terminal through Radio Resource Control, RRC, signaling used to configure pre-configured resources.

18. A user equipment for data transmission, comprises a processor, a memory and a transceiver;
wherein the processor is configured to read a program in the memory and perform the method of claim 10.

* * * * *